(12) United States Patent
Hongo

(10) Patent No.: US 8,228,764 B2
(45) Date of Patent: Jul. 24, 2012

(54) RECORDING/REPRODUCING APPARATUS AND RECORDING/REPRODUCING SYSTEM

(75) Inventor: Kazuhiro Hongo, Kanagawa (JP)

(73) Assignee: Sony Corporation, Tokyo (JP)

( * ) Notice: Subject to any disclaimer, the term of this patent is extended or adjusted under 35 U.S.C. 154(b) by 55 days.

(21) Appl. No.: 12/613,653

(22) Filed: Nov. 6, 2009

(65) Prior Publication Data
US 2010/0157746 A1 Jun. 24, 2010

(30) Foreign Application Priority Data
Dec. 19, 2008 (JP) ................. 2008-324272

(51) Int. Cl.
*G11B 11/00* (2006.01)
(52) U.S. Cl. .................................... 369/13.01
(58) Field of Classification Search .............. None
See application file for complete search history.

(56) References Cited

U.S. PATENT DOCUMENTS

| 8,116,174 | B2* | 2/2012 | Nishida et al. ............. 369/13.33 |
| 2001/0048643 | A1* | 12/2001 | Inoue et al. ................... 369/13 |
| 2002/0051422 | A1* | 5/2002 | Sugiura et al. ............. 369/275.1 |
| 2004/0085861 | A1* | 5/2004 | Hamann et al. ............ 369/13.01 |
| 2004/0194119 | A1* | 9/2004 | Miyanishi et al. ............ 720/659 |
| 2005/0047283 | A1* | 3/2005 | Ruigrok ...................... 369/13.14 |
| 2006/0075417 | A1* | 4/2006 | Miyanishi et al. ............ 720/658 |
| 2007/0041119 | A1* | 2/2007 | Matsumoto et al. ............ 360/59 |
| 2007/0109919 | A1* | 5/2007 | Yokoyama et al. ........ 369/13.24 |
| 2008/0080039 | A1* | 4/2008 | Hongo et al. ................. 359/237 |
| 2008/0158709 | A1* | 7/2008 | Tanaka et al. .................. 360/59 |
| 2010/0128577 | A1* | 5/2010 | Kotani ....................... 369/13.24 |
| 2010/0157747 | A1* | 6/2010 | Hongo et al. .............. 369/13.24 |

FOREIGN PATENT DOCUMENTS

| JP | 3842162 | 8/2006 |
| JP | 4133841 | 6/2008 |

OTHER PUBLICATIONS

U.S. Appl. No. 12/627,592, filed Nov. 30, 2009, Hongo, et al.

* cited by examiner

*Primary Examiner* — Joseph Feild
*Assistant Examiner* — Henok Heyi
(74) *Attorney, Agent, or Firm* — Oblon, Spivak, McClelland, Maier & Neustadt, L.L.P.

(57) ABSTRACT

A recording/reproducing apparatus includes an optical source and a near-field light generating unit. The near-field light generating unit includes two conductors facing to each other at a predetermined distance and generating near-field light between the two conductors by irradiation of light from the optical source. These two conductors are arranged so that a direction along which the two conductors face to each other is substantially in parallel with the longitudinal direction of a recording mark region. Here, the recording mark region is prepared from a predetermined recording material and having shape anisotropy when information is recorded on a recording medium on which the recording mark is independently formed.

12 Claims, 21 Drawing Sheets

RECORDING/REPRODUCING APPARATUS AND RECORDING/REPRODUCING SYSTEM

BACKGROUND OF THE INVENTION

1. Field of the Invention

The present invention relates to a recording/reproducing apparatus and a recording/reproducing system. More specifically, the present invention relates to a recording/reproducing apparatus and a recording/reproducing system, which use near-field light.

2. Description of the Related Art

In recent years, various technologies using near-field light as recording light have been proposed to realize higher recording density on an information recording medium (see, for example, Japanese Published Patent Application Nos. 2005-202987 and 2003-308632). The use of near-field light realizes a minute light spot beyond a diffraction limit of light can be realized. Therefore, for example, attentions have been paid on a heat-assisting magnetic recording technology using near-field light as a promising technology for high density magnetic recording. In addition, various applications of near-field light to an information recording medium using a magneto-optical recording film and a phase-change recording film have been proposed.

A recording/reproducing apparatus proposed in Japanese Published Patent Application No. 2005-202987 performs information recording on recording layers (recording mark regions) each having a fine structure not larger than the wavelength of incident light by irradiation of near-field light from a minute opening of a probe where the diameter of the opening is not larger than the wavelength of the incident light. In Japanese Published Patent Application No. 2005-202987, furthermore, an optical information recording medium includes recording layers (recording mark regions) with circular fine structures formed independently from one another when viewed from the light-irradiation side.

A recording/reproducing apparatus proposed in Japanese Published Patent Application No. 2003-308632 performs information recording on recording layers formed on fine structure layers not larger than the wavelength of incident light by irradiation of near-field light from a minute opening of a probe where the diameter of the opening is not larger than the wavelength of the incident light.

As a method of generating near-field light other than one using a probe as described in the above patent documents, for example, there is a method using surface plasmon resonance generated on the surface of a conductor when light is irradiated on the conductor. In this method, for example, if the polarization direction of light is aligned with the longitudinal direction of a rectangular conductor formed on a transparent substrate when light is irradiated on the conductor, electric charges are localized in the conductor under the electric field of incident light. Oscillation generated by localization of the charges is known as surface plasmons. When a resonance wavelength of surface plasmons is equal to a wavelength of incident light, surface plasmons are brought into a resonance state called surface plasmon resonance. In this case, the conductor becomes an electric dipole, which is strongly polarized in the longitudinal direction of the conductor. When the conductor becomes the electric dipole, a large electromagnetic field is generated near the both ends in the longitudinal direction of the conductor to generate near-field light.

SUMMARY OF THE INVENTION

In the optical information recording medium described in the above Japanese Published Patent Application No. 2005-202987 and a magnetic recording medium called a patterned medium used for a hard disk or the like, recording mark regions (hereinafter, also simply referred to as a recording marks) are formed independently. In general, the recording mark has an isotropic shape (for example, a circular shape) when viewed from the light-irradiation side. If near-field light is irradiated on such a recording mark having an isotropic shape, there is no change in amount of light absorbed in the recording mark in principle even when the positional relationship between the recording mark and a structural component generating near-field light (such as conductor) is changed.

However, if the recording mark formed on the patterned medium or the like has shape anisotropy when viewed from the light incident side, a change in amount of light absorbed in the recording mark may occur depending on the positional relationship between the recording mark and the structural component generating the near-field light. In this case, the near-field light may not be efficiently absorbed depending on their positional relationship.

In consideration of the aforementioned circumstance, it is desirable to provide a recording/reproducing apparatus and a recording/reproducing system, which allow recording marks with shape anisotropy independently formed on a recording medium to efficiently absorb near-field light.

A first embodiment of the present invention is a recording/reproducing apparatus that includes an optical source and a near-field light generating unit generating near-field light between two conductors facing to each other with a given distance by irradiation of light from the optical source. In such a recording/reproducing apparatus, these two conductors are arranged so that a direction along which the above two conductors face to each other is substantially in parallel with the longitudinal direction of the recording mark region prepared from a predetermined recording material and having shape anisotropy when information is recorded on a recording medium on which the recording marks are independently formed.

The term "substantially in parallel with" or "substantially parallel to" used herein means that the direction along which the two conductors face to each other and the longitudinal direction of the recording mark region may be completely parallel to each other or may be slightly deviated from such a completely parallel state because of production tolerance.

A second embodiment of the present invention is a record reproduction system that includes a recording medium, an optical source, and a near-field light generating unit. Here, on the recording medium, recording mark regions having shape anisotropy are independently formed of a predetermined recording material. Also, the near-field light generating unit includes two conductors facing to each other at a predetermined distance and generating near-field light between these two conductors by irradiation of light from the optical source. In addition, these two conductors are arranged so that a direction along which the above two conductors face to each other is substantially in parallel with the longitudinal direction of the recording mark when information is recorded on a recording medium using the near-field light.

According to any of embodiments of the present invention, two conductors are arranged so that a direction along which two conductors face to each other is substantially in parallel with the longitudinal direction of the recording mark when near-field light is used for recording information on a recording medium on which recording marks having shape anisotropy are independently formed. Therefore, the near-field light can be efficiently absorbed in the recording marks having shape anisotropy.

BRIEF DESCRIPTION OF THE DRAWINGS

FIG. 2 is a schematic diagram of near-field light generating unit of the first embodiment, where

FIG. 4 is a diagram illustrating the results of analyzing the field-intensity distribution of near-field light in the first embodiment, where

FIG. 10 is a diagram illustrating the results of analyzing the field-intensity distribution of near-field light in the first modified example, where

FIG. 13 is a diagram illustrating the results of analyzing the field-intensity distribution of near-field light in the second modified example, where

FIG. 16 is a diagram illustrating the results of analyzing the field-intensity distribution of near-field light in the third modified example, where

FIG. 24 is a schematic diagram illustrating the configuration of a recording/reproducing apparatus according to a second embodiment of the present invention, where

DESCRIPTION OF THE PREFERRED EMBODIMENTS

Hereinafter, exemplary configurations of recoding/reproducing apparatus and recording/reproducing system according to embodiments of the present invention will be respectively described with reference to the attached drawings. Their descriptions will be in the order of:

1. First embodiment: Example of basic configuration
2. Second embodiment: Example of configuration in which distance between recording medium and near-field light generating unit is optimized This invention is not limited to any of the following examples and embodiments.

1. First Embodiment

Configuration of Recording/Reproducing Apparatus

Figure 1:
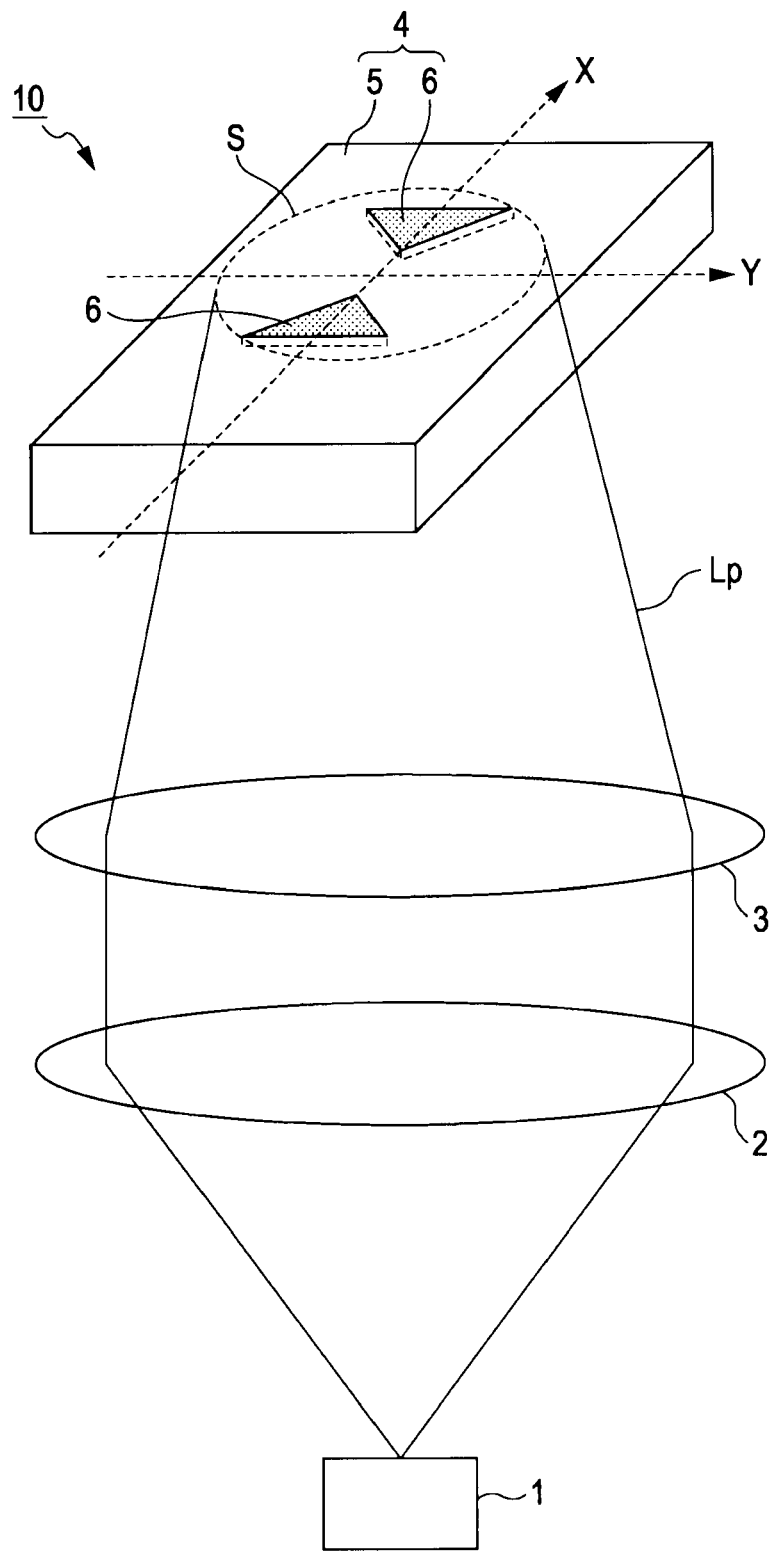
FIG. 1 is a schematic diagram illustrating the configuration of a recording/reproducing apparatus according to a first embodiment of the present invention.

FIG. 1 is a diagram schematically illustrating a section where an optical near-field is generated (hereinafter, referred to as a near-field light production section) in a recording/reproducing apparatus according to a first embodiment of the present invention. The recording/reproducing apparatus of this embodiment is an apparatus of an optical recording system using near-field light or an apparatus of a heat-assisting magnetic recording system. The near-field light production section 10 mainly includes an optical source 1, a collimator lens 2, a condenser lens 3, and a near-field light generating unit 4.

The optical source 1 emits light (hereinafter, a propagating light) to the near-field light generating unit 4. In this embodiment, the propagating light Lp may be circularly-polarized light or may be light linearly polarized in substantially the same direction as the direction along which two conductors 6 in pairs are facing to each other (direction "X" in FIG. 1). In addition, the wavelength of propagating light Lp emitted from the optical source 1 may be any wavelength as far as it allows the generation of near-field light between paired conductors 6 which will be described later. For example, the propagating light used may be of 780 nm in wavelength.

The collimator lens 2 makes the propagating light emitted from the light source 1 into collimated light. The condenser lens 3 condenses the collimated light so that the propagating light Lp of a predetermined spot size S can be irradiated on the near-field light generating unit 4.

Figure 2A:
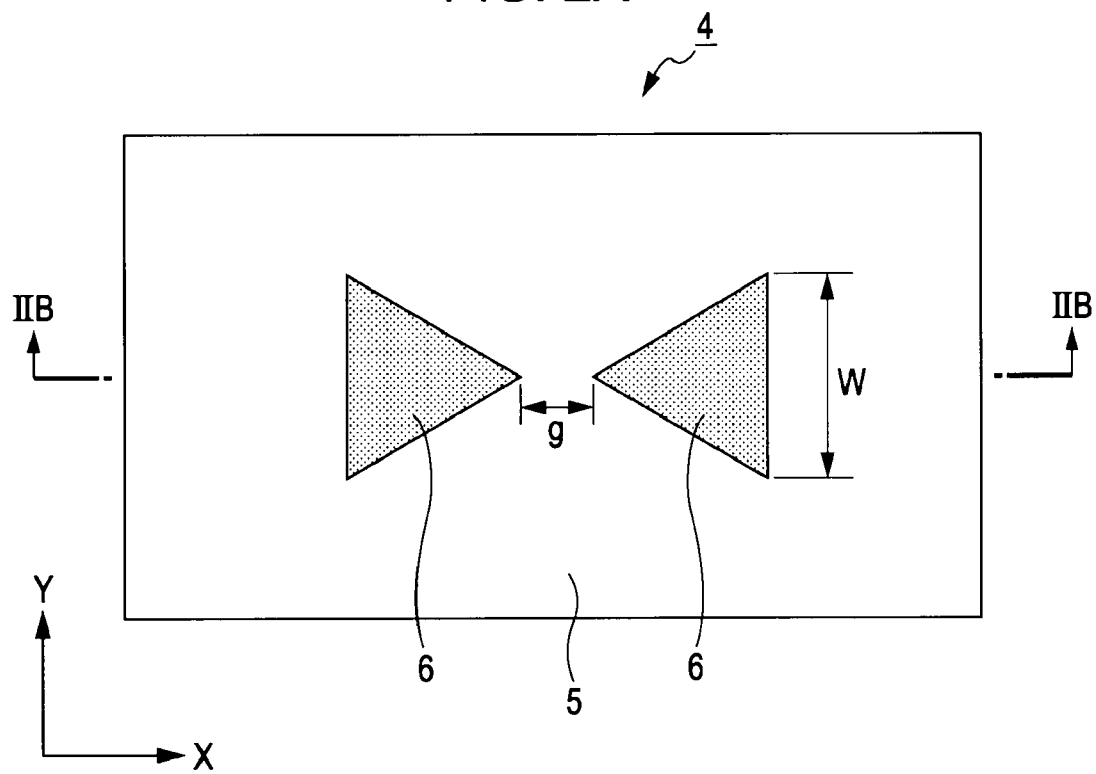
FIG. 2A is a top view of the near-field light generating unit and FIG. 2B is a cross-sectional view along the dashed line IIB-IIB in FIG. 2A.
Figure 2B:
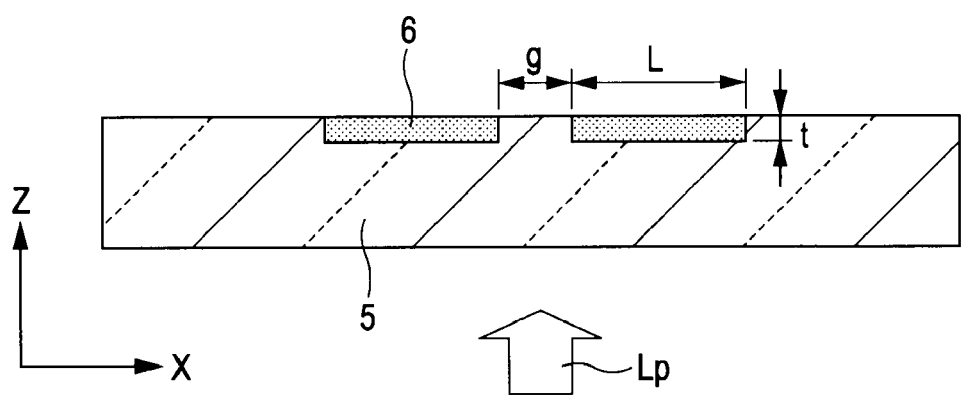

The schematic configuration of the near-field light generating unit 4 is illustrated in FIG. 2. FIG. 2A is a top view of the near-field light generating unit 4 and FIG. 2B is a cross-sectional view along a dashed line IIB-IIB in FIG. 2A. The near-field light generating unit 4 includes a substrate 5 and two conductors 6 formed on one side (the top) of the substrate 5. The propagating light Lp from the optical source 1 enters from the opposite side (the back) of the substrate 5, on which the paired conductors 6 are not formed.

The substrate 5 is formed of a plate-shaped, optically transparent member. In other words, the substrate 5 is made of a material which is optically transparent at usable light wavelengths. For example, the material for forming the substrate 5 may be preferably one with a transmittance of approximately 70% or more. More specifically, any of IV group semiconductors such as Si and Ge and III-V group compound-semiconductors such as GaAs, AlGaAs, GaN, InGaN, InSb, GaSb, and AlN may be suitably used as a material for forming the substrate 5. Alternatively, any of II-VI group compound semiconductor materials such as ZnTe, ZnSe, ZnS, and ZnO may be suitably used as a material for forming the substrate 5. Alternatively, furthermore, any of oxide insulators such as ZnO, $Al_2O_3$, $SiO_2$, $TiO_2$, CrO2, and $CeO_2$, nitride insulators such as SiN, and plastics may be suitably used as a material for forming the substrate 5.

Both two conductors 6 (conductor parts) are formed of a metal film with a triangular top. Furthermore, an example shown in FIG. 2, two conductors 6 may be substantially equal in shape with a slight difference in tip angle, width W of the side opposite to the tip, length L in the polarization direction P, or the like due to manufacturing variations or the like. Furthermore, a predetermined corner tip of one of the paired conductors 6 is arranged facing to the corresponding corner tip of the other of the paired conductors 6. Then, the tips of them are placed apart from each other at a predetermined distance "g" (hereinafter, also referred to as a gap size g) in the X direction (hereinafter, also referred to as a gap direction) in FIG. 1. In other words, the paired conductors 6 are arranged in the form of a bow-tie. Thus, as the paired conductors 6 are arranged so that their protruded or tip portions can face to each other, near-field light can be easily generated between the paired conductors 6. Furthermore, for instance, such an arrangement of the conductors 6 may be employed as one for heat-assisting magnetic recording using near-field light.

The gap size g between the paired conductors 6 is made sufficiently smaller than the wavelength of the propagating light Lp. In this embodiment, furthermore, the gap size g is adjusted to a size equal to or less than a longitudinal length of a recording mark region having shape anisotropy described later. Furthermore, the gap size g is suitably adjusted to an appropriate one so that near-field light with a sufficient strength can be generated between two conductors 6 and the spot diameter of the near-field light can be placed within a range appropriate to objective information recording when the propagating light Lp from the optical source 1 is irradiated between the two conductors 6.

In this embodiment, the paired conductors 6 are embedded and formed in one surface of the substrate 5 to even the surfaces of the respective conductors 6 and the surface of the substrate 5, thereby providing smooth transition between them (see FIG. 2B). As a method for manufacturing the near-field light generating unit 4 having such a configuration, for example, the following method may be employed. First, hollows are formed in the predetermined areas on the substrate 5, where the conductors 6 are to be formed, so that the depth of the hollowed areas will correspond to the thickness t of the conductors 6. Subsequently, a metal film is formed on the surface of the substrate 5 where the hollowed areas are formed. Then the metal film is ground until the surface of the substrate 5 other than the hollowed areas is exposed. However, the embodiment of the present invention is not limited to such a process. Alternatively, a pair of conductors 6 (metal films) with a predetermined shape may be formed on the flat surface of the substrate 5.

Materials which can be used for preparing the photoconductors 6 include metals (i.e., Au, Ag, Pt, Cu, Al, Ti, W, Ir, Pd, Mg, and Cr), semiconductors (i.e., Si and GaAs), and materials with good conductivities such as carbon nanotubes.

[Operation of Near-Field Light Generation and Distribution of Field Intensity]

The operation of near-field light generation in this embodiment is as follows: First, propagating light Lp at a predetermined wavelength is emitted from the optical source 1. The propagating light Lp is condensed between a pair of conductors 6 of the near-field light generating unit 4 through the collimator lens 2 and the condenser lens 3. Therefore, electric charges are intensively distributed on the surface between the paired conductors 6 and an electric field, or near-field light, is generated so as to connect the tips of the respective conductors 6 in pairs. In this embodiment, the near-field light is used as light to be irradiated on a recording medium at the time of recording information on the recording medium.

In order to check the characteristics of the near-field light generated between the paired conductors 6 as described above, the intensity distribution (distribution of electric field intensity) of near-field light generated between the paired conductors 6 was investigated by a simulation analysis with the FDTD (Finite Difference Time Domain) method.

Figure 3:
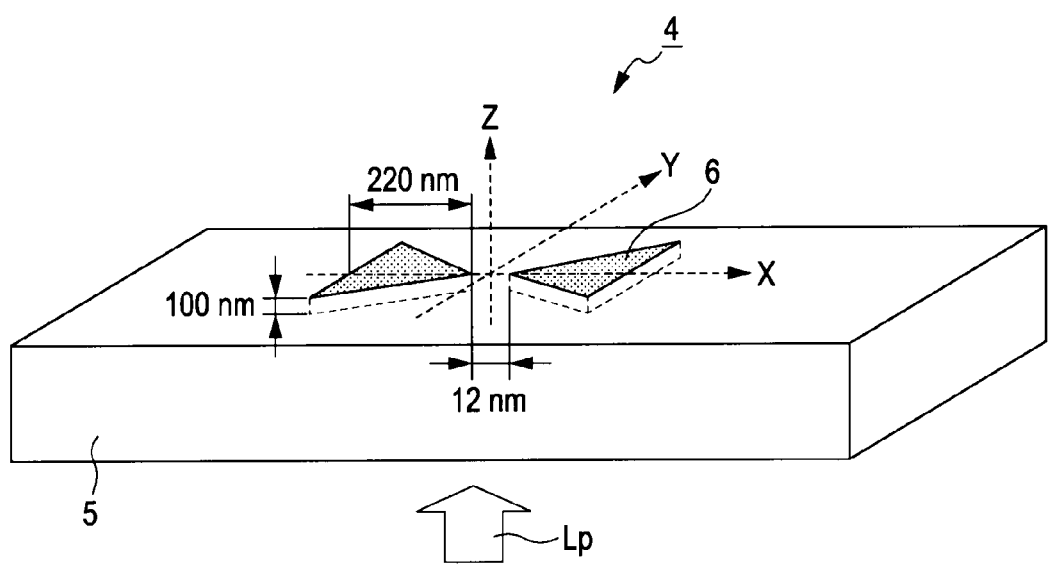
FIG. 3 is a diagram illustrating the analytical conditions of a simulation analysis employed in the first embodiment.

FIG. 3 illustrates conditions (materials and dimensions) for the simulation analysis. In this simulation analysis, the substrate 5 is made of $SiO_2$ and the conductors 6 are made of Au. In addition, each conductor 6 has a width (W) of 440 nm, a length (L) of 220 nm, and a thickness (t) of 100 nm. A gap size (g) between the paired conductors 6 is 12 nm (also see FIG. 2). In this embodiment, the mid-position between the paired conductors 6 on the plane where the conductors 6 are formed on the substrate 5 is defined as an origin of the coordinates of the X axis, the Y axis, and the Z axis.

In this simulation analysis, left-handed polarized propagating light Lp at a wavelength of 780 nm (light having electric field components in the X and Y directions in FIG. 3) is irradiated from the negative side of the Z axis to the near-field light generating unit 4. The information-recording side of a recording medium is arranged above the near-field light generating unit 4 at a distance of 7 nm in the Z direction (Z=+7 nm) via an air layer. The absolute value of the dielectric constant of the recording medium is sufficiently larger than that of the air, so that the component of the electric field in the Z direction that enters into the recording medium will be very small according to the boundary conditions of the Maxwell's equations. Therefore, in the simulation analysis, attention is only paid on both the X-direction component and the Y-direction component of the electric field (Z=+7 nm). The distance between the conductors 6 and the information-recording surface (7 mm), which is determined by the simulation, is one of typical values being assumed now when information recording is performed using near-field light.

Figure 4A:
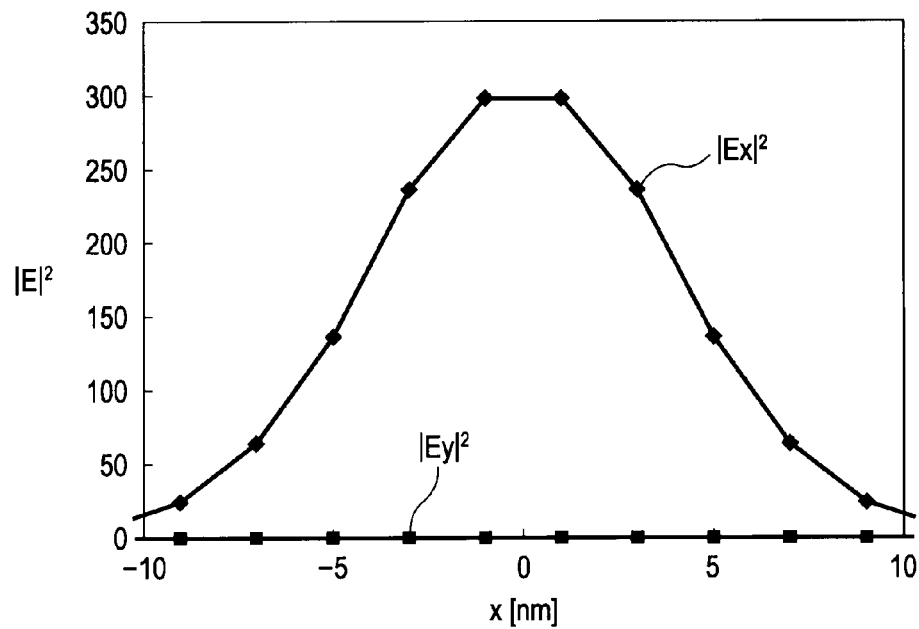
FIG. 4A is a graphical representation of the field intensity in the X direction and FIG. 4B is a graphical representation of the field intensity in the Y direction.
Figure 4B:
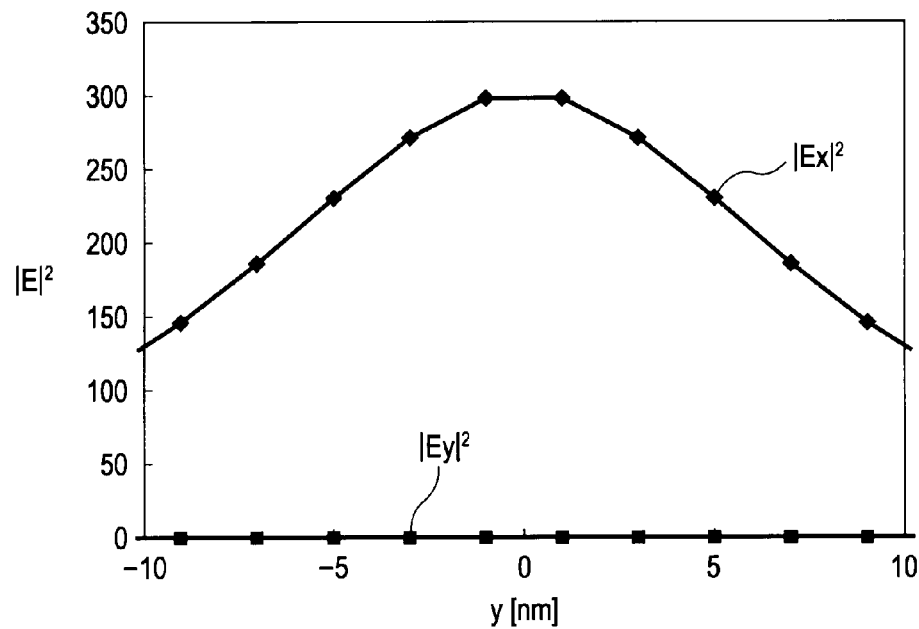

The results of the simulation analysis are shown in FIG. 4. FIG. 4A is a diagram illustrating both the distribution of the X-direction component $|Ex|^2$ and the distribution of the Y-direction component $|Ey|^2$ of the electric field at a position (X, Y, Z)=(x, 0, +7 nm), or any position along the X axis (Z=+7 nm). FIG. 4B is a diagram illustrating both the distribution of the X-direction component $|Ex|^2$ and the distribution of the Y-direction component $|Ey|^2$ of the electric field at a position (X, Y, Z)=(0, y, +7 nm), or any position along the X axis (Z=+7 nm). Here, the characteristic curves of rhomboid marks in FIGS. 4A and 4B represent the distributions of the X-direction component $|Ex|^2$. Also, the characteristic curves of square marks in FIGS. 4A and 4B represent the distributions of the Y-direction component $|Ey|^2$.

As is evident from FIGS. 4A and 4B, the Y-direction component Ey of the electric field of the near-field light generated between the paired conductors 6 is very smaller than the X-direction component Ex thereof and thus the main electric field component of the near-field light is an electric field component in the X direction, Ex. In other words, the near-field light generated between the paired conductors 6 has extremely similar properties as those of linearly-polarized propagating light in the direction along which the paired conductors 6 face to each other (gap direction). The above simulation analysis has been described as one using circularly-polarized light as the propagating light Lp from the optical source 1. The same effects as those shown in FIG. 4 can be obtained in the case of using linearly-polarized light Lp in substantially the same direction as one along which the paired conductors 6 face to each other (gap direction).

[The Configuration of a Record Reproduction System]

Figure 5:
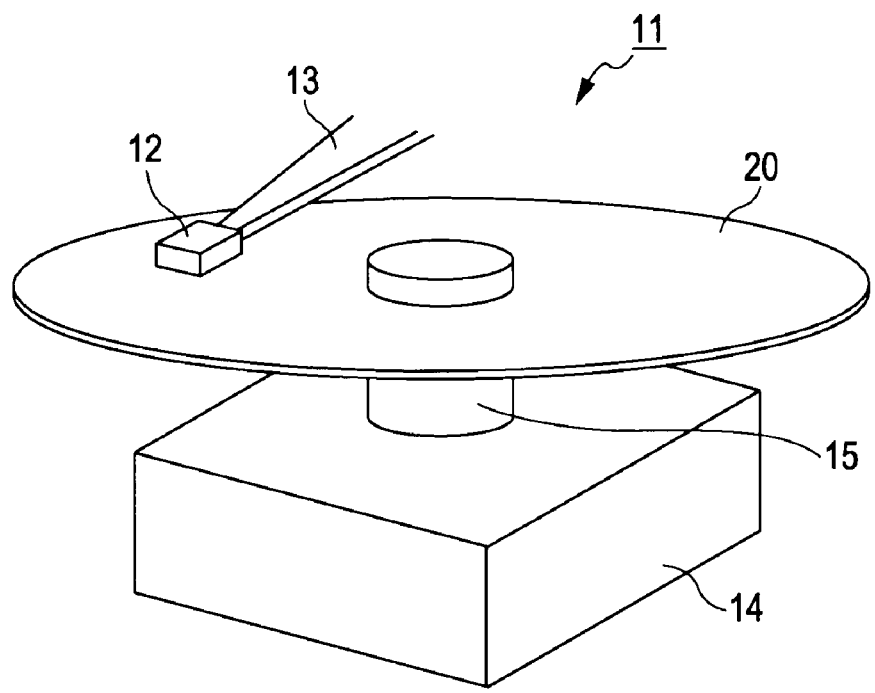
FIG. 5 is a schematic diagram illustrating the configuration of a recording/reproducing system according to the first embodiment of the present invention.

FIG. 5 is a schematic diagram illustrating an exemplary configuration of a recording/reproducing system when a recording medium is attached on the recording/reproducing apparatus of the present embodiment. The recording/reproducing apparatus 11 mainly includes a flying slider head 12, a suspension 13 which supports the flying slider head 12, and a spindle 14 that drives the rotation of the recording medium 20. Furthermore, the recording medium 20 is fixed on the rotation axis 15 of the spindle 14.

The recording medium 20 of the present embodiment may be a disk-shaped medium and provided with a plurality of nano-sized recording marks made of a predetermined recording material. Each recording mark has shape anisotropy, and 1-bit information is recorded on one recording mark. During the information recording, information is recorded by heating each recording mark by near-field light. Materials for forming such a recording mark may be any of recording-layer materials used for magneto-optical recording media, magnetic recording media, phase-change media, pigment media, and so on.

Figure 6:
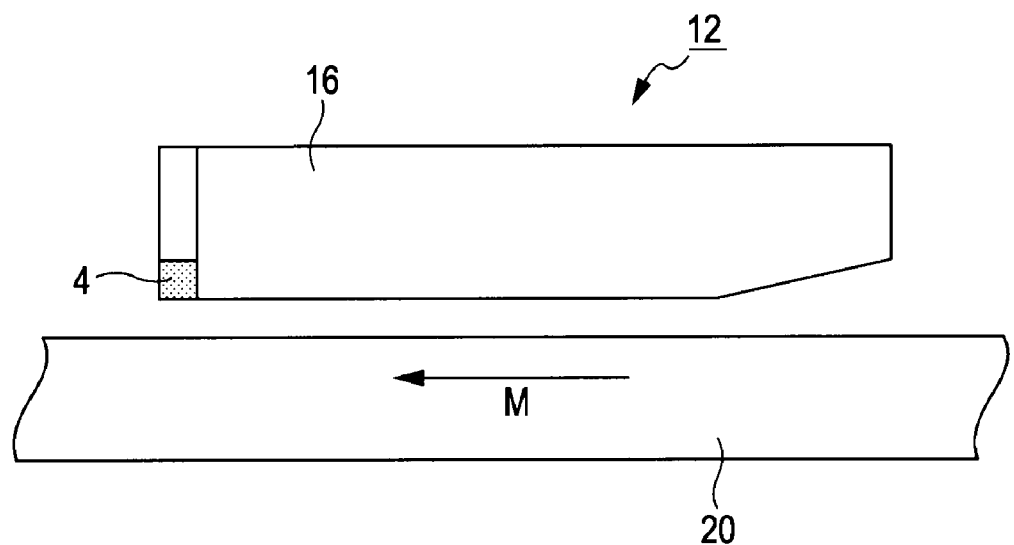
FIG. 6 is a schematic diagram illustrating a state around the boundary between a flying slider head and a recording medium during an information-recording process.

FIG. 6 is a schematic diagram illustrating the state of carrying out the recording/reproduction of information by the recording/reproducing apparatus 11 of the present embodiment on which the recording medium 20 is attached. In other words, FIG. 6 illustrates the operation of the recording/reproducing system. The recording/reproducing apparatus 11 of this embodiment uses a flying slider head 12 for recording information on the recording medium 20. The slider body 16 of the flying slider head 12 is arranged facing the recording medium 20. The recording medium 20 may travel at a high speed relative to the flying slider head 12 (in the direction of the arrow M in FIG. 6). In this case, the relative displacement of the slider body 16 is controlled while being lifted at a predetermined flying height from the surface of the recording medium 20 by the elastic force of the suspension 13. For example, the space between the recording medium 20 and the conductors 6 may be adjusted to 10 nm or less.

The near-field light production section 10, such as one as illustrated in FIG. 1, is mounted on the slider body 16 so that the near-field light generating unit 4 may face the recording medium 20. In this case, the near-field light generating unit 4 is arranged so that one side thereof on which a pair of the conductors 6 (not shown in FIG. 6) is formed can face the recording medium 20. Furthermore, the optical source 1 (not shown in FIG. 6) may be a semiconductor laser or the like and light emitted from the optical source 1 is irradiated between the paired conductors 6 of the near-field light generating unit 4 through a waveguide and so on. As a result, near-field light is generated between the paired conductors 6 to record the information.

Here, if the recording medium is also designed to optically reproduce information therefrom, the recording head including the near-field light generating unit 4 may also serve as an information-reproducing head (one example thereof will be described in detail in Modified Example 6) or may be provided separately. In addition, if the recording medium is a type of magnetically reproducing information, a reproduction-only head may be separately mounted in addition to the recording head having the near-field light generating unit 4. In the above embodiment, the recording/reproducing apparatus capable of recording and reproducing information has been described. However, the embodiment of the present invention is not limited to such a recording/reproducing apparatus. Alternatively, for example, the recording head provided with the near-field light producing section 10 shown in an FIG. 1 may be applied to an information-recording apparatus which is designed specifically for information recording.

[Relationship Between Arrangement of conductors and Arrangement of Recording Marks]

Figure 7:
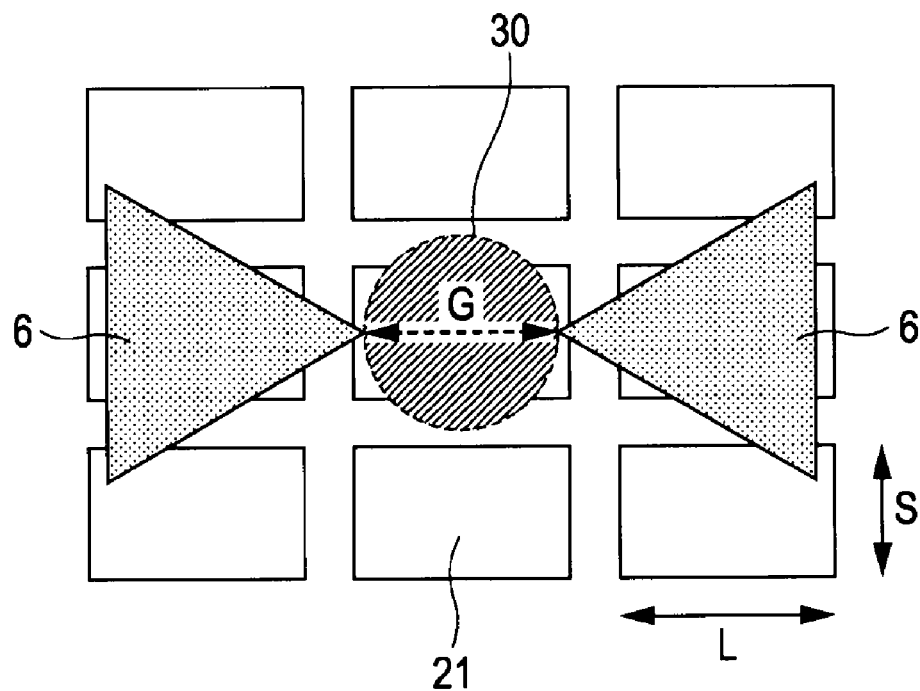
FIG. 7 is a schematic diagram illustrating a positional relationship between two conductors and recording marks.

FIG. 7 illustrates the positional relationship between a pair of conductors 6 of the near-field light generating unit 4 and recording marks formed on the recording medium 20 during the process of recording information on the recording medium 20. Here, an example illustrated in FIG. 7, each recording mark 21 is formed in a rectangle viewed from the side thereof on which near-field light is irradiated (i.e., in the vertical direction of the drawing). Furthermore, in the example shown in FIG. 7, one of the longitudinal direction (L) and the width direction (S) of the recording mark 21 corresponds to the line direction (track direction) of the recording medium 20, while the other of the longitudinal and width directions of the recording mark 21 corresponds to the track-pitch direction of the recording medium 20. In the example of FIG. 7, the center positions of the respective recording marks 21 on the adjacent tracks are aligned in the track-pitch direction.

In this embodiment, the paired conductors 6 are arranged so that the gap direction (the dashed arrow G in FIG. 7) of the paired conductors 6 of the near-field light generating unit 4 can be substantially in parallel with the longitudinal direction (L) of the recording mark 21 during the process of recording information on the recording medium 20.

Referring back to FIG. 4, the main electric field components of the near-field light 30 generated between the paired conductors 6 are those in the gap direction (the longitudinal direction of the recording mark 21). Therefore, the arrangement of the paired conductors 6 as shown in FIG. 7 allows the near-field light 30 to be efficiently absorbed by the recording marks 21 in the longitudinal direction thereof. As a result, it becomes possible to lower the power of the propagating light Lp from the outside (optical source) to increase the temperature of the recording mark 21 to a predetermined level (target temperature). The relationship between the arrangement of the paired conductors 6 with respect to the recording mark 21 and the absorption efficiency of the optical near-field will be described later in detail.

The first embodiment has been described with reference to the example in which the arrangement of the paired conductors 6 is shaped like a bow tie on the near-field light generating unit 4. However, the embodiment of the present invention is not limited to such an arrangement. Alternatively, it may be suitably changed to another arrangement, for example, depending on usage, specifications, or facilitation of production. Hereafter, modified examples of the arrangement of a pair of conductors 6 will be described.

Modified Example 1

Figure 8:
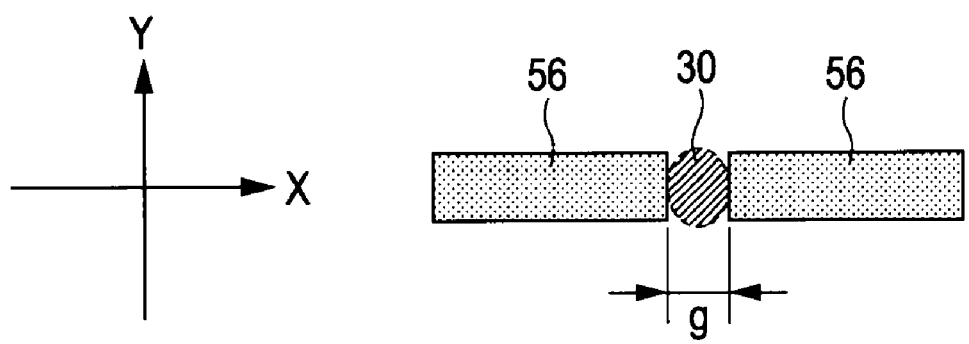
FIG. 8 is a schematic diagram illustrating the configuration of a pair of conductors in a first modified example.

FIG. 8 is a first modified example (Modified Example 1) of the arrangement of paired conductors viewed from above them (the side thereof facing a recording medium). In this modified example 1, two conductors 56 are configured and arranged to form a so-called a double-rod shape. These two conductors 56 (conductor part) have the same configuration and the sides thereof facing the recording medium have a rectangular shape. Furthermore, the conductors 56 are arranged so that one narrow side of one thereof can face one narrow side of the other thereof.

In the modified example illustrated in FIG. 8, the direction along which the narrow sides of the respective conductors 56 are facing to each other (the direction along the long side of the conductor 56) is defined as an X direction. In contrast, the direction perpendicular to the X direction (the direction along the narrow side) is defined as a Y direction. Furthermore, the thickness direction of the conductor 56 is defined as a Z direction.

Furthermore, the gap size g is adjusted so that near-field light with a sufficient strength can be generated between two conductors 56 and the spot diameter of the near-field light can be placed within a range appropriate to objective information recording when the propagating light Lp from an optical source is irradiated between the two conductors 6. During the process of recording information on the recording medium 20, the direction along which two conductors 56 face to each other (the gap direction) substantially corresponds to the longitudinal direction of a recording mark having shape anisotropy formed on the recording medium.

Here, in the configuration of the modified example 1, like the first embodiment, the distribution of electric field intensity of near-field light 30 generated between the paired conductors 56 is also investigated by the simulation analysis using the FDTD method.

Figure 9:
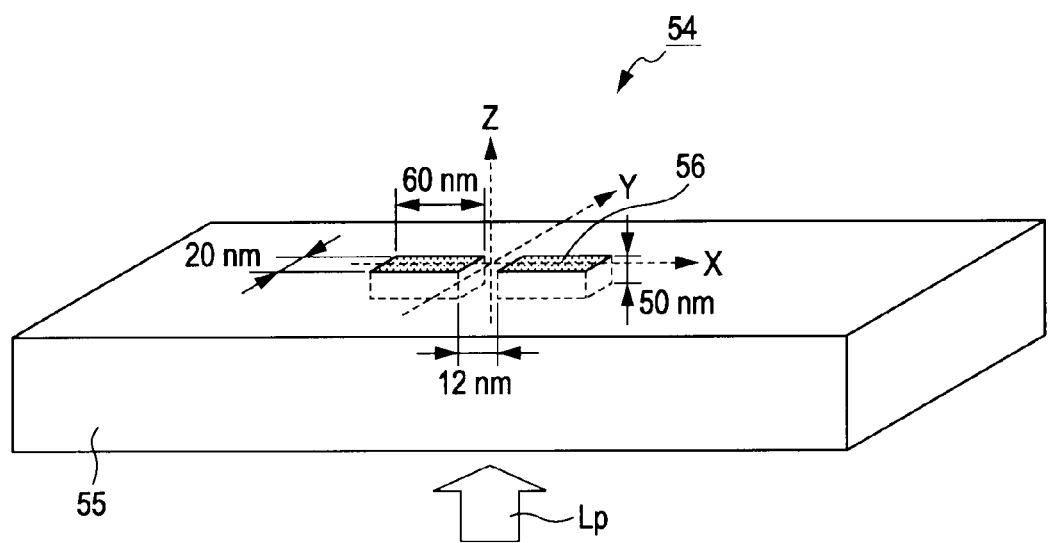
FIG. 9 is a schematic diagram illustrating analytical conditions of a simulation analysis in the first modified example.

FIG. 9 illustrates conditions (materials and dimensions) for the simulation analysis. In this simulation analysis, the substrate 55 is made of $SiO_2$ and the conductors 56 are made of Au. In addition, each conductor 56 has a width (W) of 20 nm, a length (L) of 60 nm, and a thickness (t) of 50 nm. A gap size (g) between the paired conductors 56 is 12 nm. Other simulation conditions are similar to those of the first embodiment. In this embodiment, the mid-position between the paired conductors 56 on the plane where the conductors 56 are formed on the substrate 55 is defined as an origin of the coordinates of the X axis, the Y axis, and the Z axis.

Figure 10A:
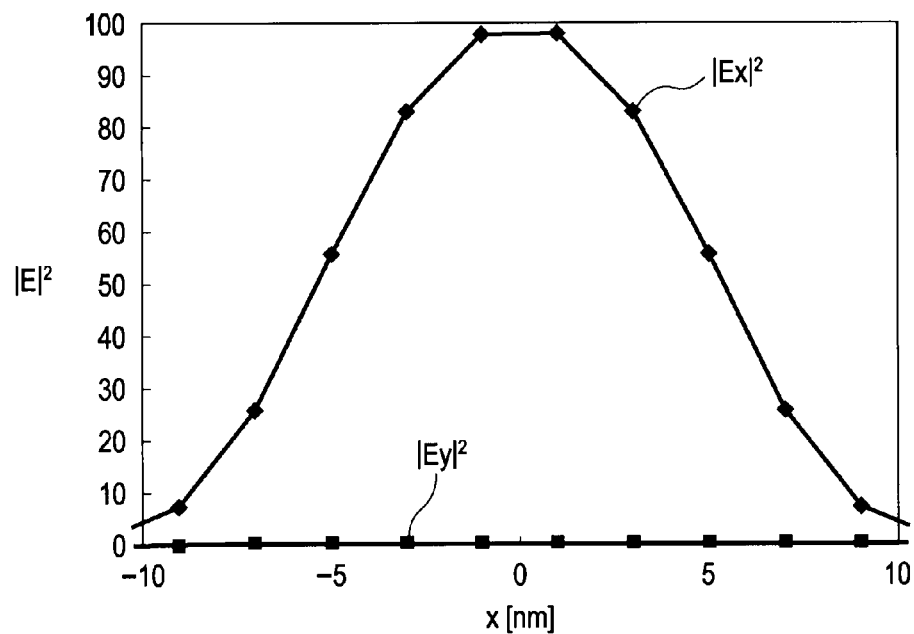
FIG. 10A is a graphical representation of the field intensity in the X direction and FIG. 10B is a graphical representation of the field intensity in the Y direction.
Figure 10B:
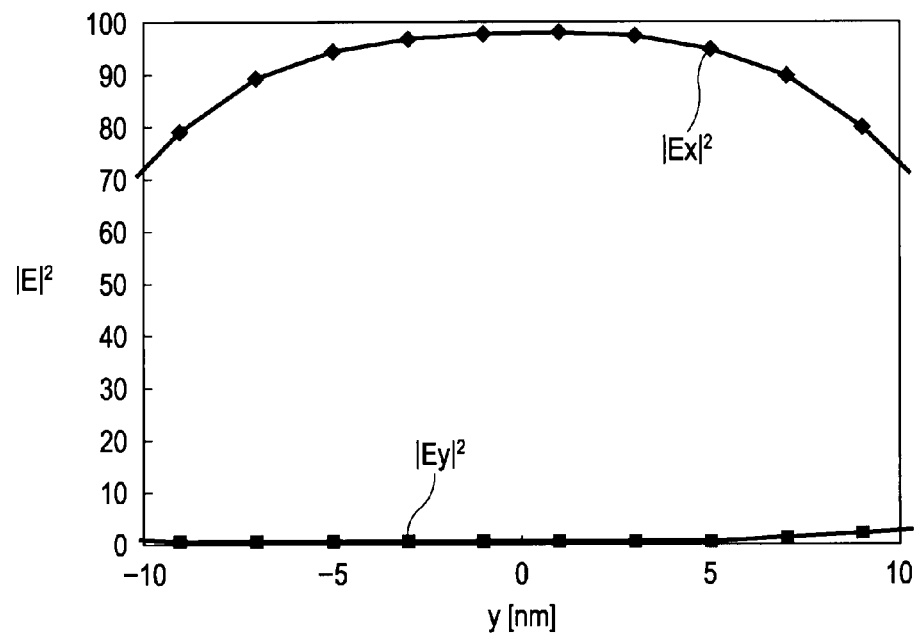

The results of the simulation analysis are represented in FIG. 10. FIG. 10A is a diagram illustrating both the distribution of the X-direction component $|Ex|^2$ and the distribution of the Y-direction component $|Ey|^2$ of the electric field at a position $(X, Y, Z)=(x, 0, +7\ nm)$, or any position along the X axis $(Z=+7\ nm)$. FIG. 10B is a diagram illustrating both the distribution of the X-direction component $|Ex|^2$ and the distribution of the Y-direction component $|Ey|^2$ of the electric field at a position $(X, Y, Z)=(0, y, +7\ nm)$, or any position along the Y axis $(Z=+7\ nm)$. Here, the characteristic curves of rhomboid marks in FIGS. 10A and 10B represent the distributions of the X-direction component $|Ex|^2$. Also, the characteristic curves of square marks in FIGS. 10A and 10B represent the distributions of the Y-direction component $|EY|^2$.

As is evident from FIGS. 10A and 10B, in the configuration of the first modified example, the Y-direction component Ey of the electric field of the near-field light generated between the paired conductors 56 is very smaller than the X-direction component Ex thereof and thus the main electric field component of the near-field light is an electric field component in the X direction, Ex. In other words, just as in the case with the first embodiment, the near-field light generated between the paired conductors 56 of the first modified example has extremely similar properties as those of linearly-polarized propagating light in the direction along which the paired conductors 56 face to each other (gap direction).

Modified Example 2

Figure 11:
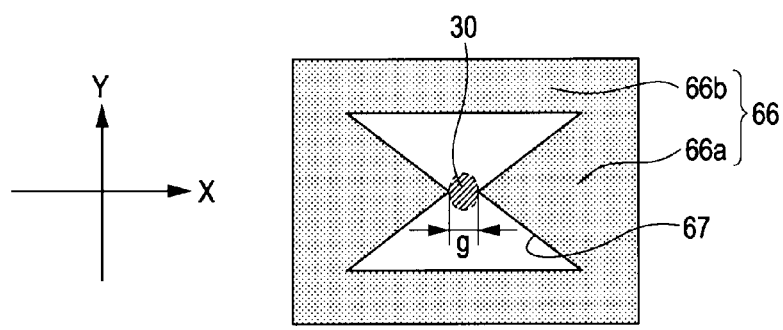
FIG. 11 is a schematic diagram illustrating the configuration of a pair of conductors in a second modified example.

FIG. 11 is a schematic diagram illustrating the configuration of the top of a conductor (the side thereof facing to a recording medium) according to a second modified example (Modified Example 2) of the present invention. The conductor 66 of the second modified example is of a so-called bow-tie slot type.

In this second modified example, an opening 67 is formed in the center of the conductor 66, where no metal film is formed. Two sides of the opening 67, which are opposite to each other in the X direction in FIG. 11, are protruded as a triangle (convex shape) and their sides facing each other are symmetrical with each other in the Y direction. On the other hand, two other sides of the opening 67, which are opposite to each other in the Y direction, are linear and in parallel with each other. In other words, the bow-tie-shaped opening 67 is formed in the center of the conductor 66 by two conductor parts 66a, each of which is formed of a triangle shape that defines opposite side portions of the opening 67 in the X direction, and two conductor-connecting parts 66b that connect two conductor parts 66a.

Furthermore, the gap size g is adjusted so that near-field light with a sufficient strength can be generated between two conductor parts 66a and the spot diameter of the near-field light can be placed within a range appropriate to objective information recording when the propagating light Lp from an optical source is irradiated between the two conductor parts 66a. During the process of recording information on the recording medium 20, the direction along which two conductor parts 66a face to each other (the gap direction) substantially corresponds to the longitudinal direction of a recording mark having shape anisotropy formed on the recording medium.

Here, in the configuration of the modified example 2, like the first embodiment, the distribution of electric field intensity of near-field light 30 generated between the paired conductor parts 66a is also investigated by the simulation analysis using the FDTD method.

Figure 12:
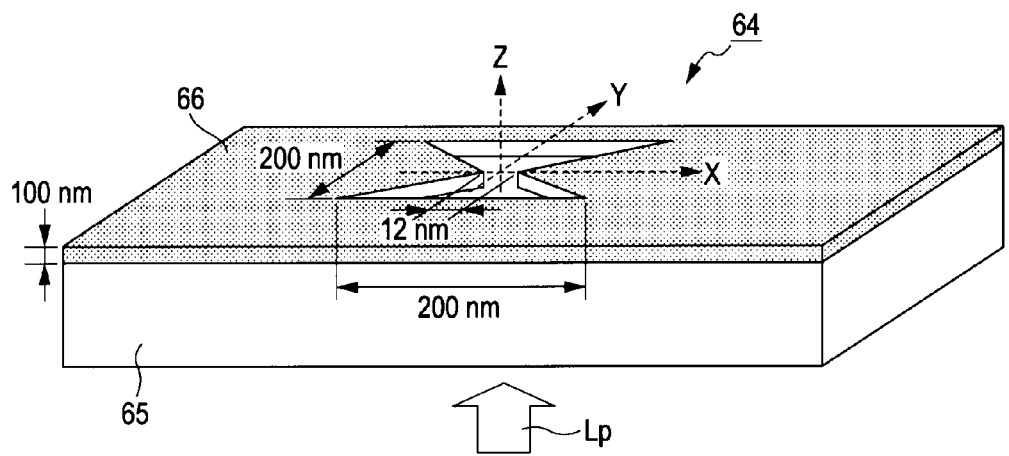
FIG. 12 is a schematic diagram illustrating analytical conditions of a simulation analysis in the first modified example.

FIG. 12 illustrates conditions (materials and dimensions) for the simulation analysis. In this simulation analysis, the substrate 65 is made of $SiO_2$ and the conductor 66 is made of Au. Furthermore, the bow-tie-shaped opening 67 has a width of 200 nm in the X direction and a width of 200 nm in the Y direction. The gap size g between two conductor parts 66a is 12 nm. In addition, the thickness of the conductor 66 is 100 nm. Other simulation conditions are similar to those of the first embodiment. In this embodiment, the mid-position between the paired conductor parts 66a on the plane where the conductor 66 is formed on the substrate 65 is defined as an origin of the coordinates of the X axis, the Y axis, and the Z axis.

Figure 13A:
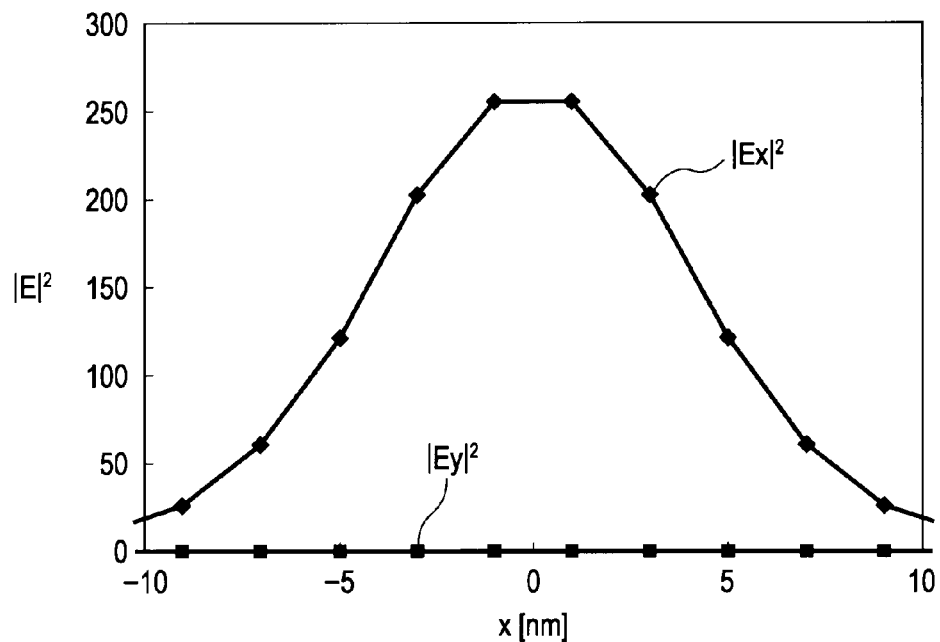
FIG. 13A is a graphical representation of the field intensity in the X direction and FIG. 13B is a graphical representation of the field intensity in the Y direction.
Figure 13B:
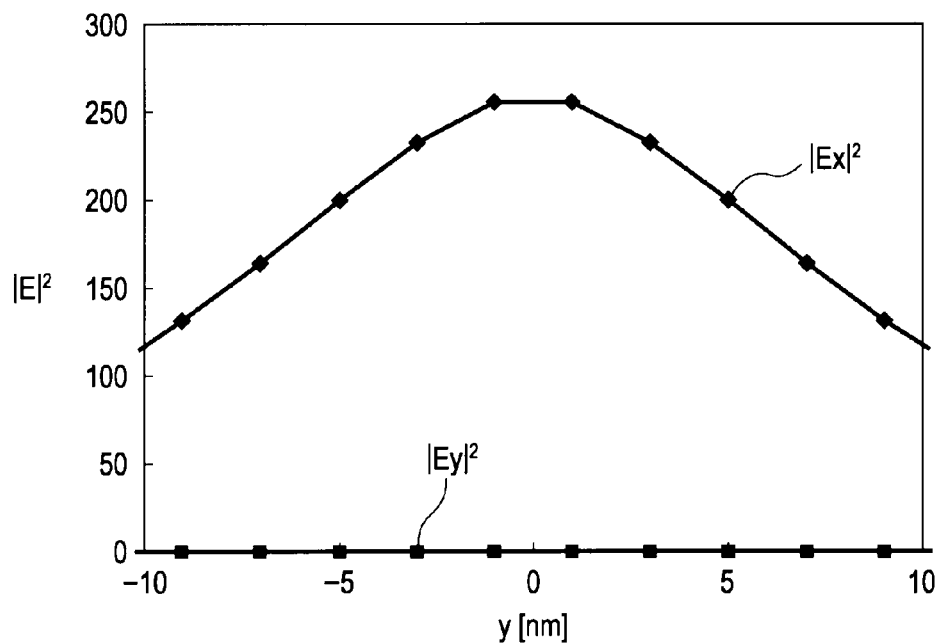

The results of the simulation analysis are represented in FIG. 13. FIG. 13A is a diagram illustrating both the distribution of the X-direction component $|Ex|^2$ and the distribution of the Y-direction component $|Ey|^2$ of the electric field at a position (X, Y, Z)=(x, 0, +7 nm), or any position along the X axis (Z=+7 nm). FIG. 13B is a diagram illustrating both the distribution of the X-direction component $|Ex|^2$ and the distribution of the Y-direction component $|Ey|^2$ of the electric field at a position (X, Y, Z)=(0, y, +7 nm), or any position along the Y axis (Z=+7 nm). Here, the characteristic curves of rhomboid marks in FIGS. 13A and 13B represent the distributions of the X-direction component $|Ex|^2$. Also, the characteristic curves of square marks in FIGS. 13A and 13B represent the distributions of the Y-direction component $|EY|^2$.

As is evident from FIGS. 13A and 13B, in the configuration of the second modified example, the Y-direction component Ey of the electric field of the near-field light generated between the paired conductor parts 66a is very smaller than the X-direction component Ex thereof and thus the main electric field component of the near-field light is an electric field component in the X direction, Ex. In other words, just as in the case with the first embodiment, the near-field light generated between the paired conductor parts 66a in the second modified example has extremely similar properties as those of linearly-polarized propagating light in the direction along which the paired conductor parts 66a face to each other (gap direction).

Modified Example 3

Figure 14:
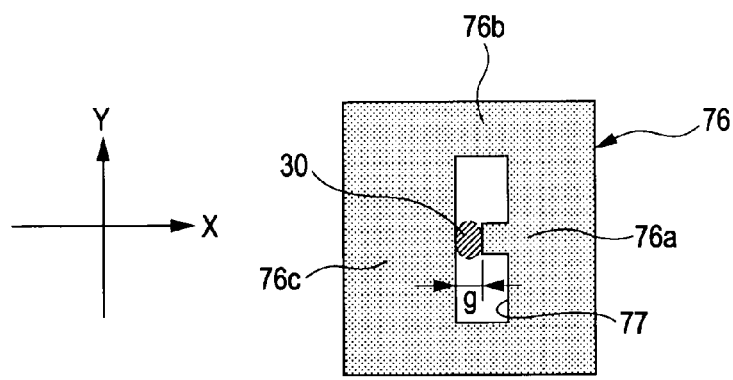
FIG. 14 is a schematic diagram illustrating the configuration of a pair of conductors according to a third modified example of the present invention.

FIG. 14 is a schematic diagram illustrating the configuration of the top of a conductor (the side thereof facing to a recording medium) according a third modified example (Modified Example 3) of the present invention. The conductor 76 of the third modified example is of a so-called C-aperture type. In this second modified example, an opening 77 is formed in the center of the conductor 76, where no metal film is formed. Two sides of the opening 77 are opposite to each other in the X direction in FIG. 14. One of these sides is protruded toward the opposite side which is formed linearly. On the other hand, two other sides of the opening 77, which are opposite to each other in the Y direction, are linear and in parallel with each other. In other words, the C-shaped opening 77 is formed in the center of the conductor 76 by two conductor parts 76a and 76c, which defines two side portions facing to each other in the X direction, and two conductor-connecting parts 76b that connect two conductor parts 76a and 77c, which defines two side portions facing to each other in the Y direction.

Furthermore, the gap size g is adjusted so that near-field light with a sufficient strength can be generated between two conductor parts 76a and 76c when the propagating light Lp from an optical source is irradiated between the two conductor parts 76a and 76c. Furthermore, the gap size g between two conductors 76a and 76c is adjusted so that the spot diameter of the near-field light can be placed within a range appropriate to objective information. During the process of recording information on the recording medium 20, the direction along which two conductor parts 76a and 76c face to each other (the gap direction) substantially corresponds to the longitudinal direction of a recording mark having shape anisotropy formed on the recording medium.

Here, in the configuration of the modified example 3, like the first embodiment, the distribution of electric field intensity of near-field light 30 generated between the paired conductor parts 76a and 76c is also investigated by the simulation analysis using the FDTD method.

Figure 15:
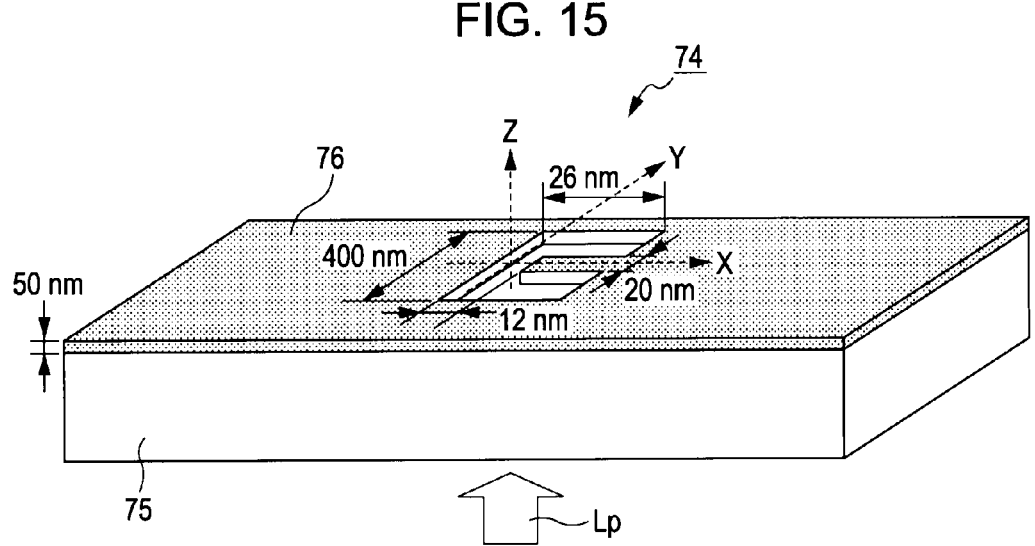
FIG. 15 is a schematic diagram illustrating analytical conditions of a simulation analysis in the third modified example.

FIG. 15 illustrates conditions (materials and dimensions) for the simulation analysis. In this simulation analysis, the substrate 75 is made of $SiO_2$ and the conductor 76 is made of Au. Furthermore, the C-shaped opening 77 has a width of 26 nm in the X direction and a width of 400 nm in the Y direction. The protruded portion of the conductor part 76a has a width of 20 nm. Furthermore, the gap size g between two conductor parts 76a and 76c is 12 nm and the thickness of the conductor 76 is 50 nm. Other simulation conditions are similar to those of the first embodiment. In this embodiment, the mid-position between the paired conductor parts 76a and 76c on the plane where the conductor 76 is formed on the substrate 75 is defined as an origin of the coordinates of the X axis, the Y axis, and the Z axis.

Figure 16A:
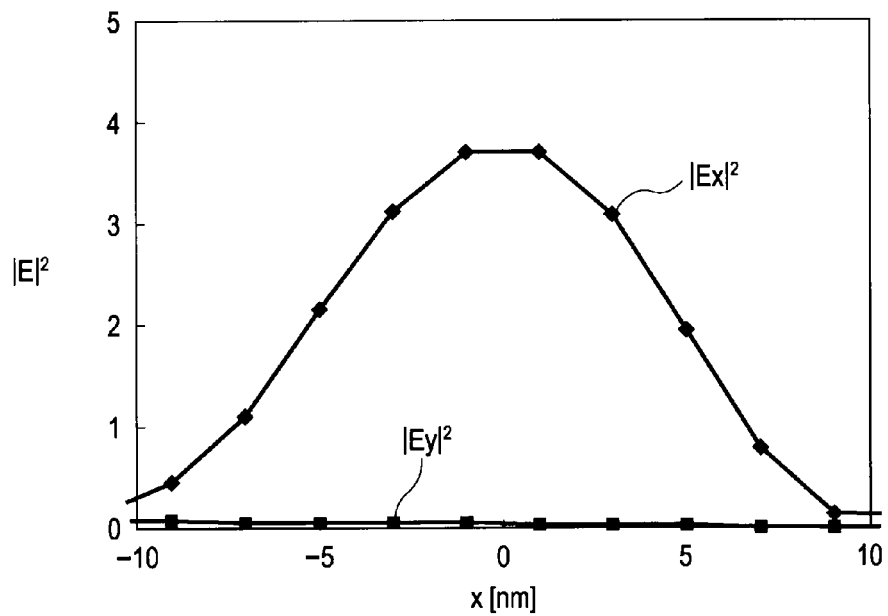
FIG. 16A is a graphical representation of the field intensity in the X direction and FIG. 16B is a graphical representation of the field intensity in the Y direction.
Figure 16B:
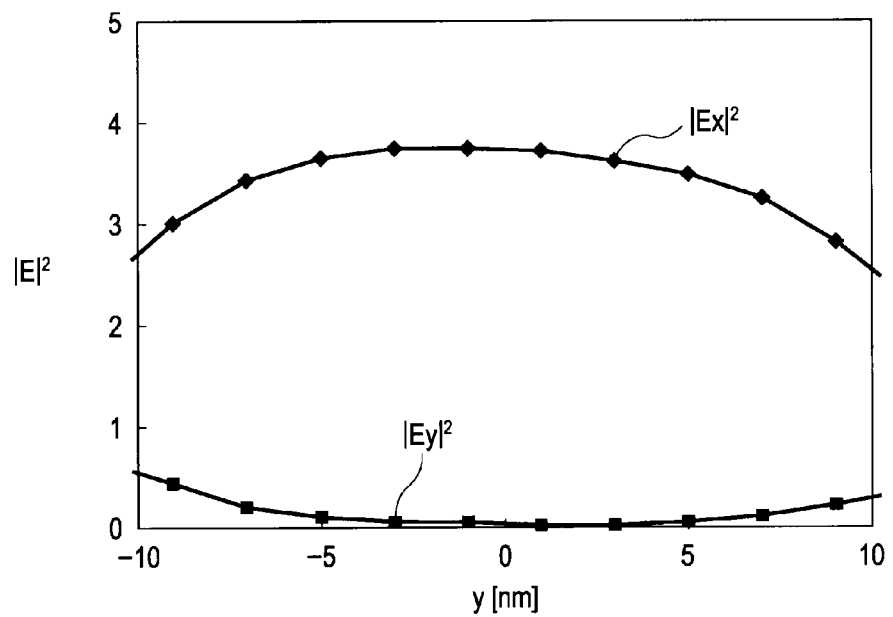

The results of the simulation analysis are represented in FIG. 16. FIG. 16A is a diagram illustrating both the distribution of the X-direction component $|Ex|^2$ and the distribution of the Y-direction component $|Ey|^2$ of the electric field at a position (X, Y, Z)=(x, 0, +7 nm), or any position along the Y axis (Z=+7 nm). FIG. 16B is a diagram illustrating both the distribution of the X-direction component $|Ex|^2$ and the distribution of the Y-direction component $|Ey|^2$ of the electric field at a position (X, Y, Z)=(0, y, +7 nm), or any position along the Y axis (Z=+7 nm). Here, the characteristic curves of rhomboid marks in FIGS. 16A and 16B represent the distributions of the X-direction component $|Ex|^2$. Also, the characteristic curves of square marks in FIGS. 16A and 16B represent the distributions of the Y-direction component $|Ey|^2$.

As is evident from FIGS. 16A and 16B, in the configuration of the third modified example, the Y-direction component Ey of the electric field of the near-field light generated between the paired conductor parts 76a and 76b is very smaller than the X-direction component Ex thereof. In other words, the near-field light is an electric field component in the X direction, Ex, just as in the case with the first embodiment, the near-field light generated between two conductor parts 76a and 76c in the third modified example has extremely similar properties as those of linearly-polarized propagating light in the direction along which two conductor parts 76a and 76c face to each other.

In any of the configurations of the above Modified Examples 1 to 3, near-field light generated between two conductor parts (or conductors) becomes linearly-polarized light in the gap direction of these two conductive parts. In other words, the near-field light generated between two conductors (or conductor parts) of any of the above Modified Examples 1 to 3 has similar properties as those of the near-field light generated in the first embodiment. Therefore, in any of Modified Examples 1 to 3, the near-field light can be efficiently absorbed by the recording marks just as in the case with the first embodiment.

[Relationship Between Arrangement of Conductors and Absorption Efficiency of Near-Field Light]

Here, the relationship between the arrangement of conductors that generate near-field light and the absorption efficiency of near-field light on recording mark (irradiation target) will be described in detail.

Figure 17:
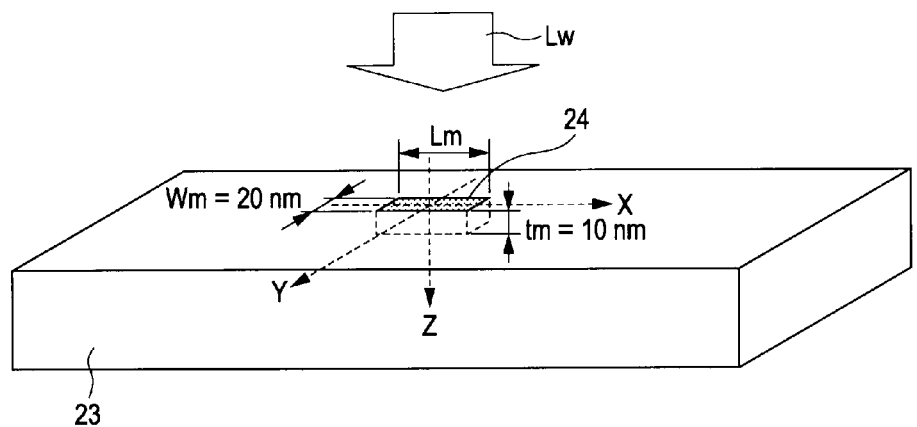
FIG. 17 is a schematic diagram illustrating analytical conditions when a change in optical absorption efficiency of a recording mark at the time of changing the shape of the recording mark and the polarization direction of light are investigated by a simulation analysis.

First, the relationship between the polarization direction of light (the plane wave of linearly polarized light is represented by the arrow Lw in FIG. 17) to be irradiated on a recording mark having shape anisotropy and the optical absorption efficiency was investigated by simulation analysis. Specifically, optical absorption efficiency was evaluated by calculating an increase in temperature of a recording mark when a predetermined amount of light was irradiated thereon for a predetermined time and the evaluation was then repeated with difference polarization directions.

FIG. 17 illustrates conditions (materials and dimensions) for the simulation analysis. In this simulation analysis, a substrate 23 is made of $SiO_2$ and recording marks 24 (irradiation targets) formed on the substrate 23 are made of Co. Furthermore, the width (Wm) of the recording mark 24 (the width thereof in the width direction) is defined as Wm=20 nm and the thickness (tm) thereof is defined as tm=10 nm. In this simulation analysis, the width (Wm) of the recording mark 24 is fixed, while the length (Lm) thereof (the width thereof in the longitudinal direction) is changed variously. The aspect ratio (Lm/Wm) of the recording mark 24 is changed variously. Changes in optical absorption efficiency with different aspect ratios of the recording mark were investigated. In this case, however, the length (Lm) of the recording mark 24 is much smaller than the wavelength of the irradiated light.

Furthermore, the simulation analysis was performed on two cases: one in which the polarization direction of light irradiated on the recording mark 24 corresponded to the longitudinal direction of the recording mark 24 (the X direction in FIG. 17); and the other in which the polarization direction of light irradiated on the recording mark 24 corresponded to the width direction of the recording mark 24 (the Y direction in FIG. 17).

Figure 18:
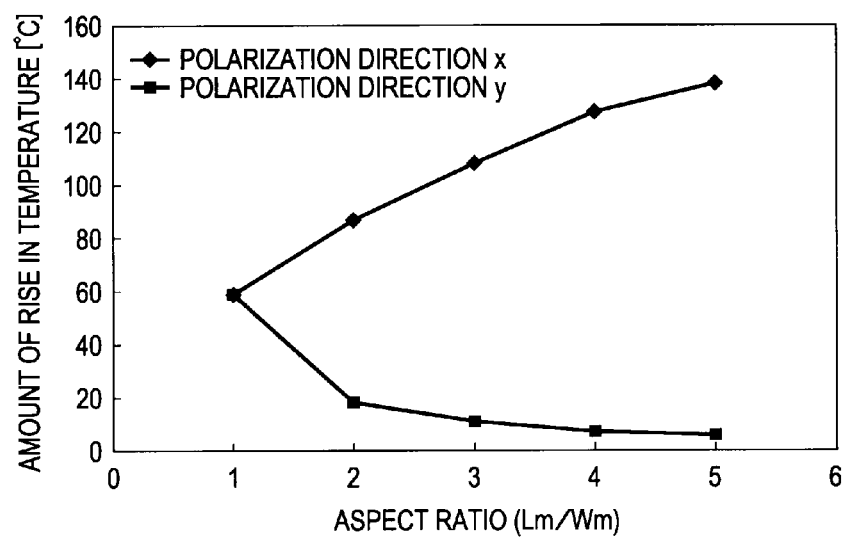
FIG. 18 is a characteristics chart illustrating changes in amount of rise in temperature of a recording mark when the shape of the recording mark and the polarization direction of light are changed.

The results of the simulation analysis are shown in FIG. 18. In FIG. 18, the horizontal axis represents the aspect ratio of the recording mark 24 and the vertical axis represents the amount of rise in temperature of the recording mark 24. Furthermore, the characteristic curve of rhomboid marks in FIG. 18 represents changes in amount of rise in temperature when light polarized in the X direction (longitudinal direction) is irradiated on the recording mark 24, while the characteristic curve of square marks represents changes in amount of rise in temperature when light polarized in the Y direction (width direction) is irradiated on the recording mark 24. In FIG. 18, furthermore, the characteristic feature of the recording mark with shape isotropy (aspect ratio=1) is also plotted for comparison.

As is evident from the characteristic curves represented in FIG. 18, the amount of rise in temperature is constant irrespective of the polarization direction of light when the recording mark with an isotropic shape (aspect ratio=1) is used. In contrast, in the case of the recording mark with shape anisotropy (aspect ratio>1), the amount of rise in temperature varies depending on the polarization direction of the irradiated light. Specifically, the case in which the polarization direction of the irradiated light corresponds to the longitudinal direction of the recording mark (in parallel with each other) leads to more rise in temperature of the recording mark, compared with the case in which both directions are perpendicular to each other. As a result, it is found that the optical absorption efficiency of the recording mark can be increased by arranging the longitudinal direction of the recording mark in substantially parallel with the polarization direction of the irradiated light.

As described above, the near-field light generated between two conductor parts (or conductors) described in any of the above Embodiment 1 and Modified Examples 1 to 3 has extremely similar properties as those of substantially, linearly-polarized propagating light in the gap direction of two conductor parts. Therefore, from the results of the analysis in FIG. 18, it becomes possible to improve the optical absorption efficiency of the recording mark by making the gap direction of two conductor parts in parallel with the longitudinal direction of the recording mark.

To confirm such an effect, the amount of rise in temperature of the recording mark 24 was calculated by a simulation analysis when the near-field light generated by the configuration of conductors of any of Embodiment 1, Modified Example 1, and Modified Example 3 was irradiated on the recording mark 24 as shown in FIG. 17. Since the characteristic properties of the near-field light (FIG. 13) generated by the configuration of Modified Example 2 are substantially the same as those of the near-field light (FIG. 4) generated by the configuration of Embodiment 1. Therefore, the configuration of Modified Example 2 will not be subjected to the simulation analysis.

Figure 19:
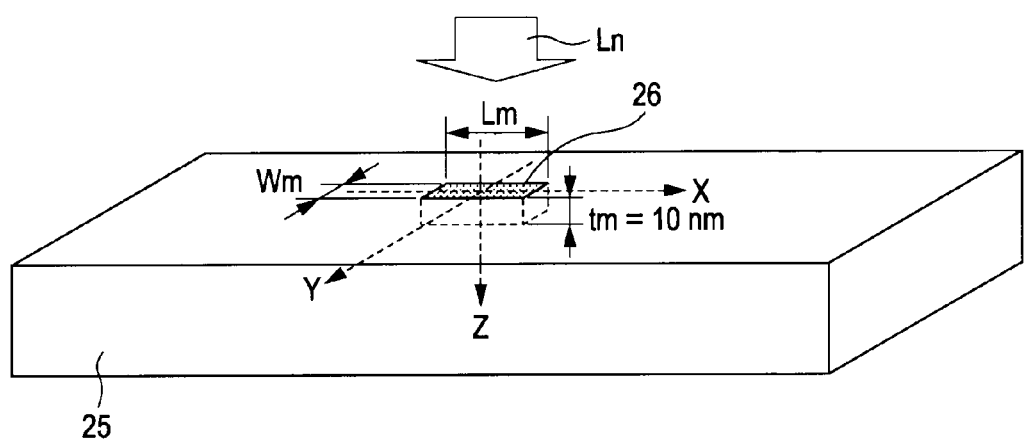
FIG. 19 is a schematic diagram illustrating analytical conditions when a change in optical absorption efficiency of a recording mark at the time of changing the shape of the recording mark and the main field direction of near-field light are investigated by a simulation analysis.

FIG. 19 illustrates conditions (materials and dimensions) for the simulation analysis. In this simulation analysis, a substrate 25 is made of $SiO_2$ and recording marks 26 formed on the substrate 25 are made of Co. The direction of the main electric field component of near-field light 30 as irradiated light (gap direction) corresponds to the X direction in FIG. 19. Propagating light, which is irradiated from the optical source to between two conductor parts (or conductors), is irradiated on conductor parts (or conductors) at a predetermined amount of light for 0.1 nsec.

In addition, the thickness (tm) of the recording mark 26 is set to tm=10 nm. In this simulation analysis, the length (Lm) of the recording mark 26 is set to Lm=20 nm and the width (Wm) thereof is set to Wm=8 nm. The direction of the main electric field component of near-field light 30 (gap direction) corresponded to the longitudinal direction of the recording mark 26. For comparison, the same calculation was performed on the recording mark 26 of different dimensions, Lm=8 nm and Wm=20 nm (Comparative Example). In the comparative example, the length (Lm) of the recording mark 26 is shorter than the width (Wm) thereof, so that the main electric field component of near-field light 30 (gap direction) can be perpendicular to the longitudinal direction of the recording mark 26. The results of this simulation analysis are illustrated in Tables 1 and 2 below.

TABLE 1

Absolute value of amount of rise in temperature (° C.)

| | Near-field light generating unit | | |
|---|---|---|---|
| | First Embodiment | Modified Example 1 | Modified Example 3 |
| Gap direction// longitudinal direction Lm = 20 nm, Wm = 8 nm | 3601 | 839 | 26 |
| Gap direction ⊥ longitudinal direction Lm = 8 nm, Wm = 20 nm | 633 | 161 | 12 |

TABLE 2

Relative value of amount of rise in temperature (⊥ standard)

| | Near-field light generating unit | | |
|---|---|---|---|
| | First Embodiment | Modified Example 1 | Modified Example 3 |
| Gap direction// longitudinal direction Lm = 20 nm, Wm = 8 nm | 5.7 | 5.2 | 2.2 |
| Gap direction ⊥ longitudinal direction Lm = 8 nm, Wm = 20 nm | 1.0 | 1.0 | 1.0 |

The values in the column of "Gap direction//Longitudinal direction" represent the amounts of rise in temperature when the direction along which two conductor parts (or conductors) face to each other (the gap direction) corresponds to the longitudinal direction of the recording mark 26. In addition, the values in the column of "Gap direction ⊥ Longitudinal direction" represent the amounts of rise in temperature when the direction along which two conductor parts (or conductors) face to each other (the gap direction) is perpendicular to the longitudinal direction of the recording mark 26. In addition, Table 2 represents a relative ratio of amounts of rise in temperature with reference to the amount of rise in temperature of the comparative example.

As is evident from the above Tables 1 and 2, it is found that the optical absorption efficiency can be improved by an increase in amount of rise in temperature of the recording mark as a result of allowing the gap direction of two conductor parts to substantially correspond to the longitudinal direction of the recording mark.

Modified Example 4

As shown in FIG. 7, the first embodiment has been described with reference to the example in which the center positions of the respective recording marks 21 are aligned in the track-pitch direction. However, the embodiment of the present invention is not limited to such an example. Alternatively, for example, the center positions of the respective recording marks on the tracks adjacent to each other may be staggered in the track-pitch direction. An example of such an arrangement is illustrated in.

Figure 20:
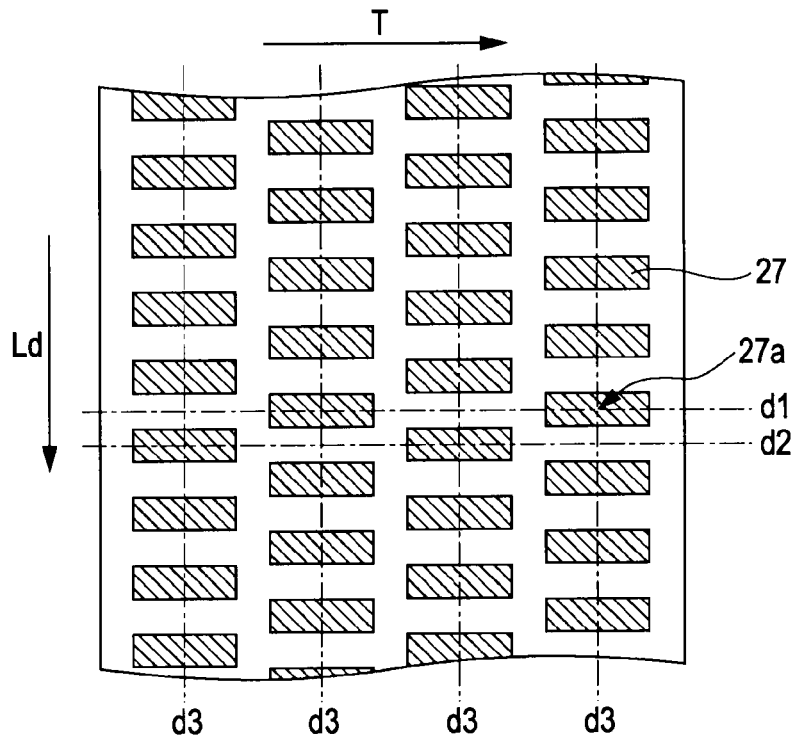
FIG. 20 is a schematic diagram illustrating the configuration of a recording mark formed on a recording medium according to a fourth modified example of the present invention.

FIG. 20 is an enlarged top view of part of an region where recording marks are formed. An example of the recording medium shown in FIG. 20 includes recording marks 27 made of a predetermined recording material and formed in a rectangular shape are arranged at a predetermined spacing in both the line direction Ld and the track-pitch direction T of the recording medium. In this case, the center positions 27a of the respective recording marks 27 on the adjacent tracks are staggered (dashed lines d1 and d2) in the track-pitch direction T (the center of each track is represented by the dashed line d3). Therefore, such an arrangement of the recording marks 27 may lead to further reduction in track pitch.

In the example illustrated in FIG. 20, furthermore, the line direction of the recording medium corresponds to the width direction of the recording mark 27, while the track-pitch direction of the recording medium corresponds to the longitudinal direction of the recording mark 27. However, the embodiment of the present invention is not limited to such an arrangement. Alternatively, for example, the line direction Ld of the recording medium may correspond to the longitudinal direction of the recording mark 27, while the track-pitch of the recording medium may correspond to the width direction of the recording mark 27.

Modified Example 5

Figure 21:
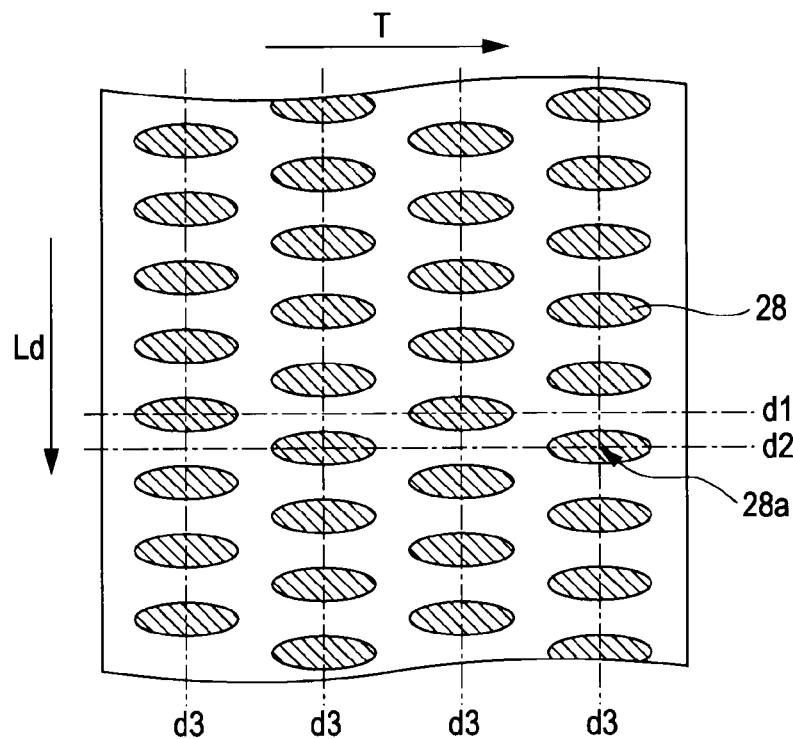
FIG. 21 is a schematic diagram illustrating the configuration of a recording mark formed on a recording medium according to a fifth modified example of the present invention.

Each of the first embodiment and the fourth modified example has been described with reference to the example in which the recording medium is formed in a rectangular shape viewed from the direction of irradiating near-field light. However, the embodiment of the present invention is not limited to such a shape. Alternatively, the recording mark may have any shape as long as it retains shape anisotropy in the direction of irradiating the near-field light. An example of such a case is illustrated in FIG. 21. Here, FIG. 21 is a diagram illustrating the example in which a recording mark 28 is formed in an elliptical shape viewed from the direction of irradiating near-field light.

In the example illustrated in FIG. 21, the line direction Ld of the recording medium corresponds to the width direction of the recording mark 28 and the track-pith direction T of the recording medium corresponds to the longitudinal direction of the recording mark. However, the embodiment of the present invention is not limited to such an arrangement. Alternatively, for example, the line direction of the recording medium may correspond to the longitudinal direction of the recording mark 28, while the track-pitch of the recording medium may correspond to the width direction of the recording mark 28. Although the example of FIG. 21 shows the example arranged by the center positions 28a of the respective recording marks 28 on the adjacent tracks are staggered (dashed lines d1 and d2) in the track-pitch direction T. However, the embodiment of the present invention is not limited to such an arrangement. Alternatively, the center positions 28a of the respective recording marks 28 on the adjacent tracks may be aligned in the track pitch direction T.

Modified Example 6

The above first embodiment has been described with reference to the example in which the near-field light producing section 10 that generates near-field light is mounted on the recording head. However, the embodiment of the present invention is not limited to such a configuration. Alternatively, in the case of optically reproducing information from a recording medium, if the recording medium is also designed to optically reproduce information therefrom, the recording head including the near-field light producing section 10 may also serve as an information-reproducing head. In the sixth modified example, an example of such a configuration will be described.

Figure 22:
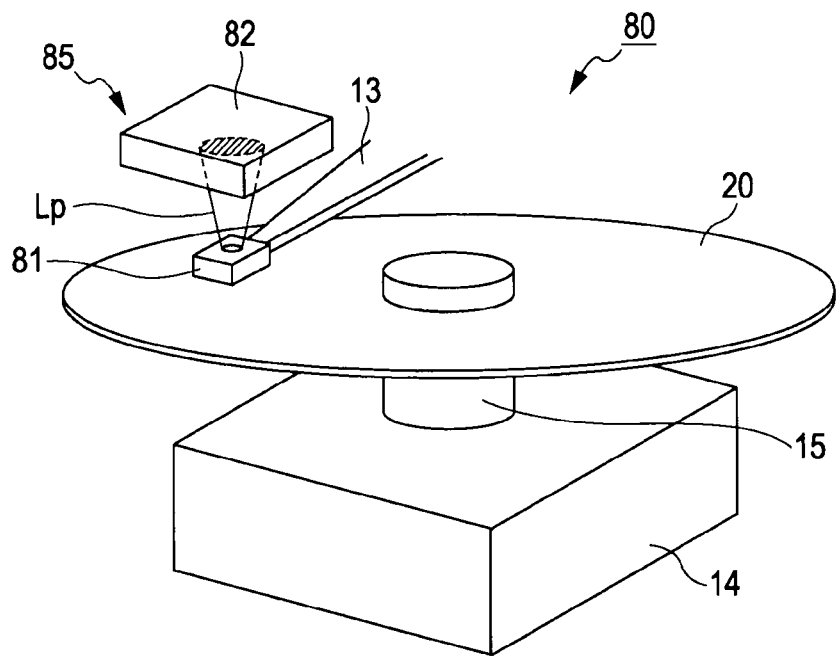
FIG. 22 is a schematic diagram illustrating the configuration of a recording/reproducing system according to the sixth embodiment of the present invention.

FIG. 22 is a schematic diagram illustrating an exemplary configuration of a recording/reproducing system when a recording medium is attached on the recording/reproducing apparatus of the sixth embodiment. The recording/reproducing apparatus 80 of the sixth modified example is configured in a manner similar to that of the first embodiment, except of a recording/reproducing head 85 that performs recording/reproduction of information. In FIG. 22, the same components as those in the above first embodiment (FIG. 5) are assigned the same reference numerals.

Figure 23:
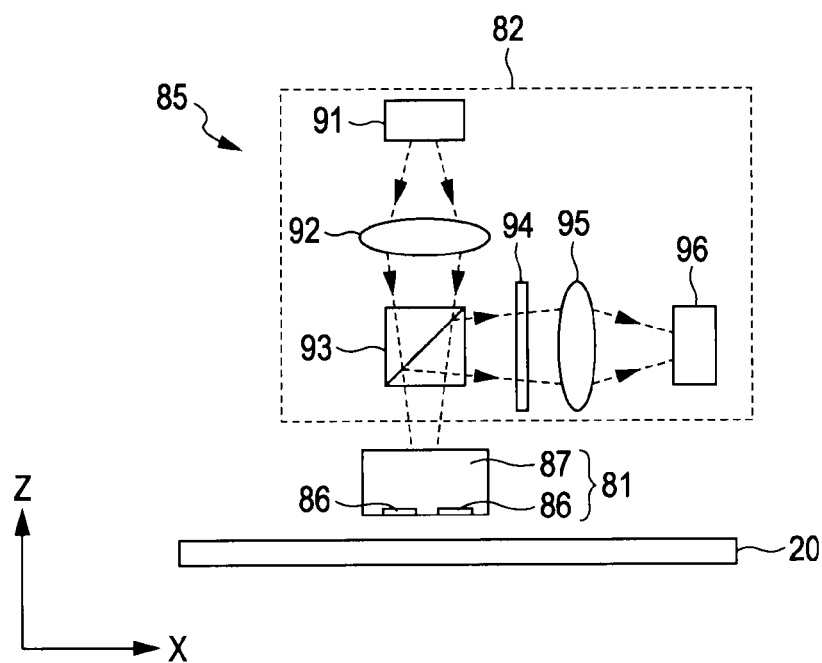
FIG. 23 is a schematic diagram illustrating the configuration of a recording/reproducing head according to the sixth embodiment of the present invention.

The schematic configuration of the recording/reproducing head 85 is illustrated in FIG. 23. In Modified Example 6, the recording/reproducing head 85 includes a flying slider unit 81 supported by a suspension 13 and an optical system 82 that irradiates propagating light Lp on the flying slider unit 81, which are configured separately. Alternatively, the flying slider unit 81 and the optical system 82 may be integrally configured and held by the suspension 13.

The flying slider unit 81 (near-field light generating unit) includes an optically transparent substrate 87 and two conductors 86 formed on one side (the top) of the substrate 87. Here, the shape, arrangement, and so on of the paired conductors 86 may be the same as those of the first embodiment (see FIG. 2). In this case, the flying slider unit 81 is arranged so that one side thereof on which a pair of the conductors 86 is formed can face a recording medium 20. When the recording medium 20 travels at a high speed relative to the flying slider unit 81, the relative displacement of the flying slider unit 81 is adjusted while being lifted at a predetermined flying height from the surface of the recording medium 20 by the elastic force of the suspension 13. Subsequently, propagating light Lp is incident on the other side of the substrate 87, which is opposite to the side thereof on which the paired the conductors 86 are formed, and an optically near-field is then generated between the paired conductors 86.

In this sixth modified example, the paired conductors 86 are arranged so that the direction (the X direction in FIG. 23) along which the paired conductors 86 of the flying slider unit 81 face to each other can be substantially in parallel with the longitudinal direction of a recording mark having shape anisotropy during the process of recording information on the recording medium 20.

The optical system 82 is provided with a recording system that performs information recording on the recording medium 20. Here, the recording system mainly includes an optical source 61, a condensing element 92, and a beam splitter 93, where the condensing element 92 is constructed of a condenser lens 92 and so on. Light emitted from the optical source 91 enters into the flying slider unit 81 via condensing element 92 and the beam splitter 93. As a result, the incident light causes the generation of near-field light between the paired conductors 86 to heat the recording mark on the recording medium 20. Therefore, the recording mark can be efficiently heated as the direction along which the paired conductors 86 face to each other substantially corresponds to the longitudinal direction of the recording mark.

Furthermore, the optical system 82 is provided with a reproducing system that performs information reproduction in response to light reflected from the recording medium 20. The reproducing system mainly includes a polarizer 94, a condensing element 95, and a light reception unit 96. The polarizer 94, the condensing element 95, and the light reception unit 96 are arranged in this order from the beam splitter 93. Light reflected from the recording medium 20 is separated from the incident light by the beam splitter 93 and then incident on the polarizer 94. The light passed through the polarizer 94 enters into the light reception unit 96 through the condensing element 95. Subsequently, the information is reproduced from the recording medium 20 on the basis of the light reflected therefrom and entered into the light reception unit 96.

Each of the first embodiment 1 and the sixth modified example has been described with reference to the example in which the head is of a flying-slider type. However, the embodiment of the present invention is not limited to such a type of the head. Alternatively, for example, the height of the head may be adjusted by an actuator or the like.

2. Second Embodiment

The near-field light production section of the recording/reproducing apparatus described in the first embodiment is able to generate a strong near-field light by making the size of a gap between a pair of conductors sufficiently smaller than the wavelength of propagating light emitted from an optical source. In the first embodiment, however, a change in gap size between the paired conductors leads to a change in shape of the generated near-field light and a change in strength of the near-field light irradiated on the recording medium. To efficiently irradiate near-field light at a higher strength during the information recording, it is necessary to optimally adjust the relationship between the gap size between the paired conductors and the distance between the recording head and the recording medium. In the second embodiment, for further optimizing their relationship, both the configuration of the recording/reproducing apparatus and the configuration of the recording/reproducing system will be described on the basis of those of the first embodiment.

[Configuration of Recording/Reproducing Apparatus]

Figure 24A:
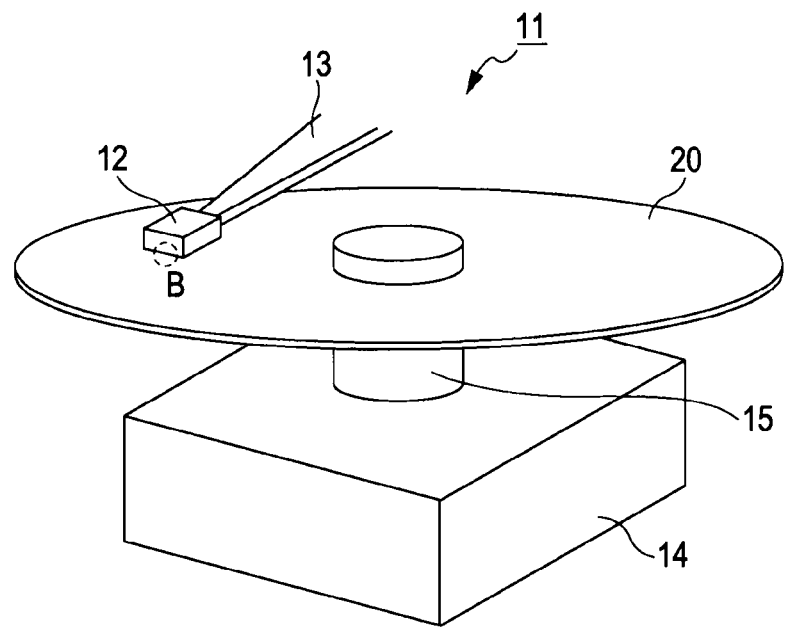
FIG. 24A is a schematic diagram illustrating the configuration of a recording/reproducing system of the second embodiment.

FIG. 24A is a diagram schematically illustrating the configuration of a recording/reproducing system which is employed during the process of information recording on a recording medium attached on the recording/reproducing apparatus of the present embodiment. In FIG. 24A, the same components as those in the above first embodiment (FIG. 5) are assigned the same reference numerals.

As is evident from the comparison between FIG. 24A and FIG. 5 (first embodiment), the recording/reproducing system employed when the recording medium is attached on the recording/reproducing apparatus of the present embodiment is generally configured in a manner similar to that of the first embodiment. In this embodiment, however, the relationship between the gap size between the paired conductors and the distance between the recording head and the recording medium during the information recording. Therefore, the description of each component in the recording/reproducing apparatus and the recording/reproducing system will be omitted in the following description, but the relationship between the gap size between the paired conductors and the distance between the recording head and the recording medium during the information recording will be described. In this embodiment, the conductors are configured and arranged in a manner similar to those of the first embodiment (see FIG. 2).

Figure 24B:
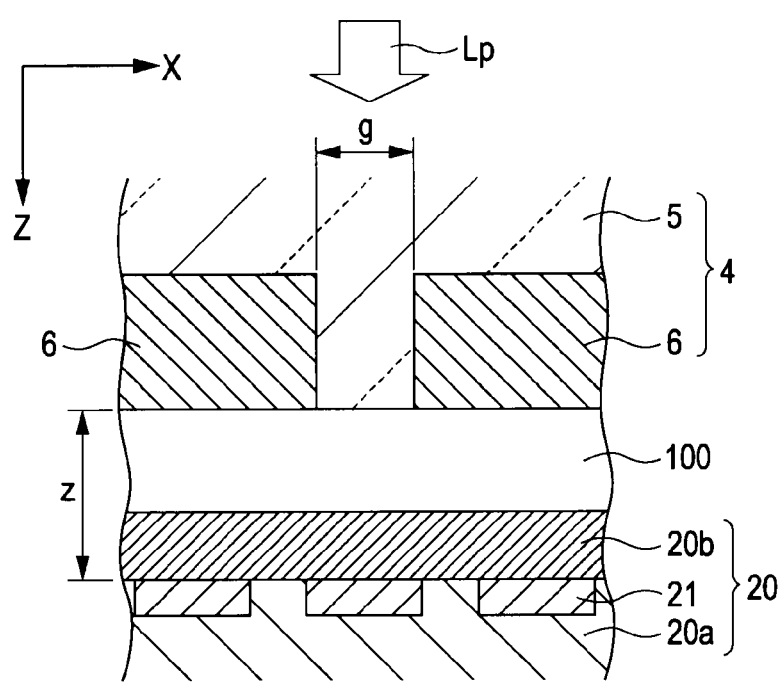
FIG. 24B is an enlarged cross-sectional view of a region B surrounded by a dashed line in FIG. 24A.

FIG. 24B illustrates an enlarged cross-sectional view of region B surrounded by a dotted line in FIG. 24A. In the example illustrated in FIG. 24B, recording marks 21 and a protective film 20b are formed on a substrate 20a of a recording medium 20. Here, for example, the protective film 20b may be formed of a diamond-like carbon film.

In the present embodiment, the protective film 20b of the recording medium 20 faces one side of the near-field light generating unit 4 mounted on the flying slider head 12, on which conductors 6 are formed, through an air layer 100. In addition, during the information recording, the direction along which paired conductors 6 face to each other (the X direction in FIG. 24B) is substantially in parallel with the longitudinal direction of the recording mark 21 just as in the case with the first embodiment.

In the present embodiment, the flying height of the flying slider head 12 is adjusted (controlled) so that the following mathematical expression 1 can be established in the relationship between the gap size (g) between the paired conductors 6 and the distance z between the conductors 6 and the recording marks 21 during the information recording (during the stable flying of the flying slider head 12).

$$g = \sqrt{2} \cdot z \quad \text{[Mathematical expression 1]}$$

If the relation of the above mathematical expression 1 is established during the information recording, then the maximum field intensity of near-field light irradiated on the recording mark 21 is attained. Thus, the near-field light can be efficiently irradiated on the recording mark 21. Hereinafter, a principle of deriving the above mathematical expression 1 will be described with reference to FIGS. 25 to 27.

Figure 25:
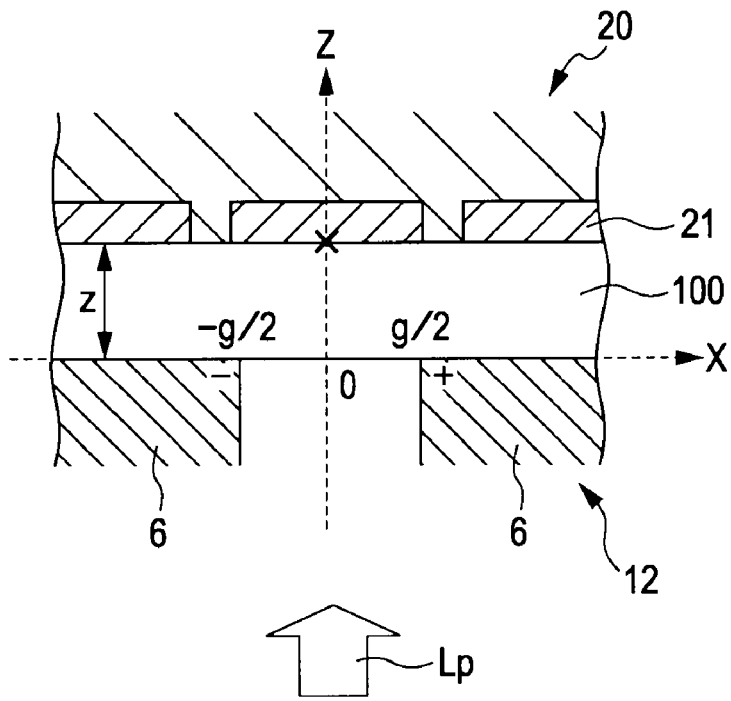
FIG. 25 is a schematic diagram illustrating an optimal relationship between the size of a gap between two conductors and a distance between the conductor and a recording mark.

FIG. 25 illustrates an enlarged cross-sectional view of a region where the flying slider head 12 and the recording medium 20 face to each other during the information recording. In FIG. 25, in order to simplify explanation, the protective film 20b shown in FIG. 24B is omitted. In addition, for convenience of explanation, the up-and-down positional relationship between the flying slider head 12 and the recording medium 20 in FIG. 25 is reversed from that of FIG. 24B because of explaining a principle of deriving the above mathematical expression 1. In this embodiment, the mid-position between the paired conductors 6 on the plane is defined as an origin ("0 (zero)" in FIG. 25) of the coordinates of the X direction (the direction along which two conductors 6 face to each other), the Y direction (perpendicular to the drawing of FIG. 25), and the Z direction.

As shown in FIG. 25, at given time in the information recording, it is considered that positive electric charges are induced near the surface of the conductor 6 at a position of X=+g/2 when the conductor 6 is placed in the "+X" direction; and negative electric charges are induced near the surface of the conductor 6 at a position of X=-g/2 when the conductor 6 is placed in the "-X" direction. Since the propagating light Lp irradiated from the optical source to between the paired conductors 6 is high-frequency light, the polarity of charges induced near the surface at a position of X=±g/2 can be alternately changed from positive to negative and vice versa in response to the frequency of the propagating light Lp irradiated between the paired conductors 6.

Under the conditions illustrated in FIG. 25, the induced electric charges spread and exist on the limited areas on the surfaces of the respective conductors 6. However, such an area is very small, so that the area of induced electric charges can be equivalently represented by point charges. In other words, in the example illustrated in FIG. 25, such an arrangement is equivalent to the case in which positive and negative point charges are arranged on the surfaces of the respective conductors 6 at positions of X=+g/2 and -g/2 in stead of the conductors 6.

Figure 26:
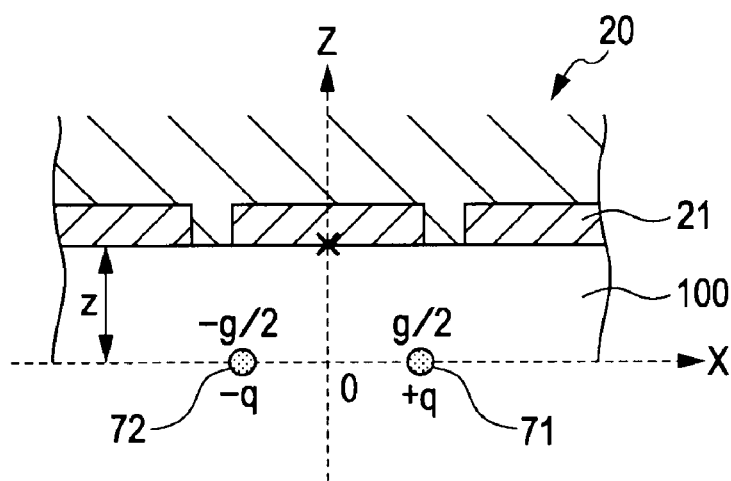
FIG. 26 is a schematic diagram illustrating an optimal relationship between the size of a gap between two conductors and a distance between the conductor and a recording mark.

FIG. 26 is a schematic diagram in which the state of the induced electric charges in FIG. 25 is equivalently represented by point charges. The state shown in FIG. 25 is equivalent to an arrangement of point charges 71 and 72, where a point charge of +q 71 is arranged at a position of (X, Y, Z)=(+g/2, 0, 0), while a point charge of -q 72 is arranged at a position of (X, Y, Z)=(-g/2, 0, 0). In the example illustrated in FIG. 26, furthermore, the amount of charge induced on the surface of each conductive substrate 6 is defined as "q".

Hereinafter, the above mathematical expression 1 will be derived with reference to the configuration illustrated in FIG. 26. The area to be considered about near-field light is considerably smaller than the wavelength of the propagating light Lp from the optical source. In this area, therefore, the above mathematical expression 1 may be calculated while electrostatically making approximation with a case that there is no phase lag of electromagnetic waves in the area.

The respective directional components $E_x$, $E_y$, and $E_z$ of the electric field (near-field light) at a position of (X, Y, Z)=(x, y, z) where the point charge 71 (+q) and the point charge 72 (-q) are generated can be represented by the following mathematical expression 2. Here, $\varepsilon_0$ in the following mathematical expression 2 is a dielectric constant of the surroundings of the point charges 71 and 72 (air layer 100).

X component: [Mathematical expression 2]

$$E_x = \frac{q}{8 \cdot \pi \cdot \varepsilon_0} \cdot \left( \frac{2x-g}{\left(x^2 - xg + \frac{1}{4}g^2 + y^2 + z^2\right)^{3/2}} - \frac{2x-g}{\left(x^2 + xg + \frac{1}{4}g^2 + y^2 + z^2\right)^{3/2}} \right)$$

Y component:

$$E_x = \frac{q}{4 \cdot \pi \cdot \varepsilon_0} \cdot \left( \frac{y}{\left(x^2 - xg + \frac{1}{4}g^2 + y^2 + z^2\right)^{3/2}} - \frac{y}{\left(x^2 + xg + \frac{1}{4}g^2 + y^2 + z^2\right)^{3/2}} \right)$$

Z component:

$$E_z = \frac{q}{4 \cdot \pi \cdot \varepsilon_0} \cdot \left( \frac{z}{\left(x^2 - xg + \frac{1}{4}g^2 + y^2 + z^2\right)^{3/2}} - \frac{z}{\left(x^2 + xg + \frac{1}{4}g^2 + y^2 + z^2\right)^{3/2}} \right)$$

In addition, the directional components of an electric field in the air layer 100 are defined as $E_{x0}$, $E_{y0}$, and $E_{z0}$, respectively. Also, the directional components of an electric field in a recording mark 21 (the irradiation target of near-field light) are defined as $E_{x1}$, $E_{y1}$, and $E_{z1}$, respectively. Furthermore, if the dielectric constant of the recording mark 21 is defined as $\varepsilon_1$ and the boundary surface between the air layer 100 and the recording mark 21 is in parallel with the XY plane, then the following mathematical expression 3 is established based on the boundary conditions of the Maxwell's equations.

$$E_{x0} = E_{x1}$$ [Mathematical expression 3]

$$E_{y0} = E_{y1}$$

$$E_{z0} = \frac{\varepsilon_1}{\varepsilon_0} E_{z1}$$

Here, the first and second equations in the above mathematical expression 3 represent that the field components $E_x$ and $E_y$, which are parallel to the boundary surface, are contiguous on the boundary between different media. In addition, the third equation of the above mathematical expression 3 represents that the field component Ez, which is perpendicular to the boundary surface, is discontinuous on the boundary between different media.

Here, it is considered that information is recorded at a position of (X, Y, Z)=(0, 0, z) (X-marked position in FIG. 26) on the recording mark 21 which faces the mid-position (origin) between two conductors 6. In this case, both the Y-direction component $E_y$ and the Z-direction component $E_z$ of the electric field becomes 0 (zero) in the above mathematical expression 1. It becomes. On the other hand, the X-direction component Ex is represented by the following mathematical expression 4:

$$E_x = -\frac{q}{4 \cdot \pi \cdot \varepsilon_0} \cdot \frac{g}{\left(\frac{1}{4}g^2 + z^2\right)^{3/2}}$$ [Mathematical expression 4]

The above mathematical expression 4 is used for obtaining the conditions from which the electric field intensity, or the near-field light intensity (absolute value) reaches its maximum at an information-recording position of (X, Y, Z)=(0, 0, z). In this recording position, the above mathematical expression 4 represents only the X-direction component Ex among the components of the electric field. Furthermore, as represented by the above mathematical expression 3, the X-direction component $E_x$ of the electric field is contiguous on the boundary surface without being affected by the difference between the dielectric constants of the inside and outside of the boundary surface between the air layer 100 and the recording mark 21. Thus, the dielectric constant $\in_0$ of the air layer 100 in the above mathematical expression 4 may be provided as an invariable. As a result, the above mathematical expression 4 can be rewritten as described below. In the following mathematical expression 5, "A" represents an invariable.

$$E_x = A \cdot \frac{g}{\left(\frac{1}{4}g^2 + z^2\right)^{3/2}}$$ [Mathematical expression 5]

Here, variable portions other than the invariable A on the right-hand side of the above mathematical expression 5 are collectively replaced with "f". That is, the variable "f" is represented by the following mathematical expression 6:

$$f = \frac{g}{\left(\frac{1}{4}g^2 + z^2\right)^{3/2}}$$ [Mathematical expression 6]

Figure 27:
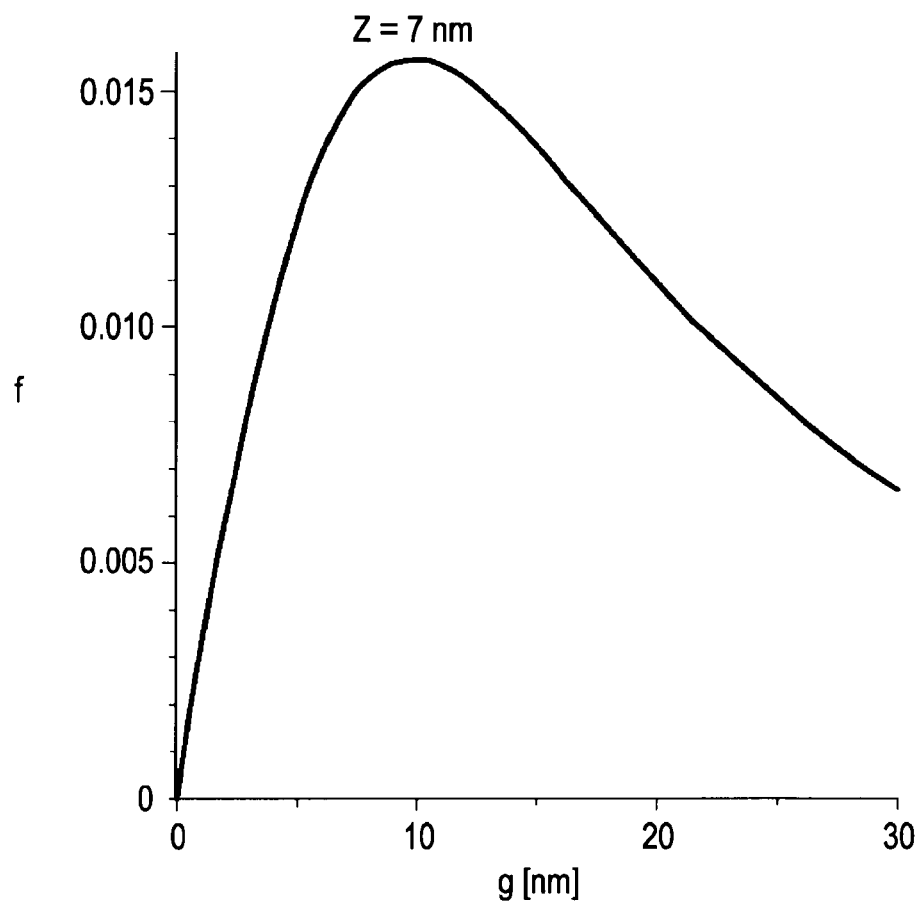
FIG. 27 is a schematic diagram illustrating a relationship between a field intensity at Z=7 nm and a gap size g between two conductors.

In the above mathematical expression 6, if the distance between the recording mark 21 and the conductor 6 is 7 nm (z=7 nm), the variable f varies as illustrated in FIG. 27 with respect to the gap size g between the conductors 6. As is evident from FIG. 27, the variable f reaches its maximum when the gap size g reaches a predetermined size. In addition, the field intensity (near-field light intensity) reaches its maximum at the maximum value of the variable f.

The condition that the variable f reaches its maximum is obtained by calculating df/dg=0 in the above mathematical expression 6 and the following mathematical expression 7, which is the same as the mathematical expression 1, is obtained.

$$g = \sqrt{2} \cdot z$$ [Mathematical expression 7]

As described above, the above mathematical expression 1 is derived. Furthermore, if the maximum value of the variable f is defined as fm, the gap size corresponding to the maximum value fm is defined as gm, and the variable f on the vertical axis and the variable g on the horizontal axis in FIG. 27 are converted into $\Delta(=f/fm)$ and $\alpha(=g/gm)$, when z=+7 nm, then the characteristics chart of FIG. 27 can be represented as one represented in FIG. 28. Furthermore, the relational expression of both the variable $\Delta$ and the variable $\alpha$ shown in FIG. 28 can be expressed by the following mathematical expression 8.

$$\Delta = \frac{3\alpha\sqrt{3}}{(\alpha^2 + 2)^{3/2}}$$ [Mathematical expression 8]

Figure 28:
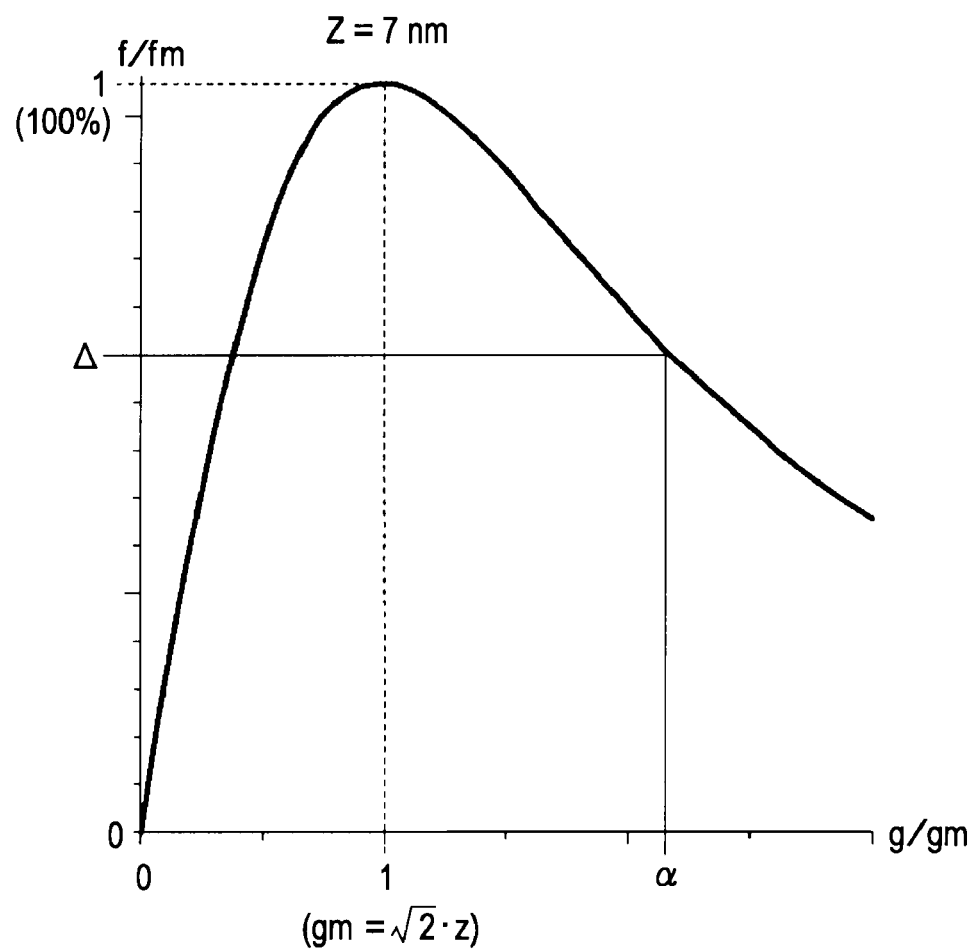
FIG. 28 is a schematic diagram illustrating a relationship between a field intensity at Z=7 nm and a gap size g between two conductors.

The above mathematical expression 8 is employed to find the range of the gap size g that allows the variable $\Delta$ to reach about 60% ($\Delta$=0.6) of $\Delta$=1 (100%) in FIG. 28. As a result, it is found that such a gap size is in the range of about 0.5071 z to 3.286 z. In other words, if the gap size g between two conductors 6 and the distance z between the recording marks 21 satisfy a relational expression of g=0.5071 z to 3.286 z, then near-field light is irradiated on the recording mark 21 at a field intensity of about 60% of the peak value.

Furthermore, the above mathematic expression 8 is employed to find the range of the gap size g that allows the variable $\Delta$ to reach about 90% ($\Delta$=0.9) of the peak value. As a result, it is found that such a gap size is in the range of about 0.9284 z to 2.087 z. In other words, if the gap size g between two conductors 6 and the distance z between the recording marks 21 satisfy a relational expression of g=0.9284 z to 2.0787 z, then near-field light is irradiated on the recording mark 21 at a field intensity of about 90% of the peak value.

Specific Examples

Figure 29:
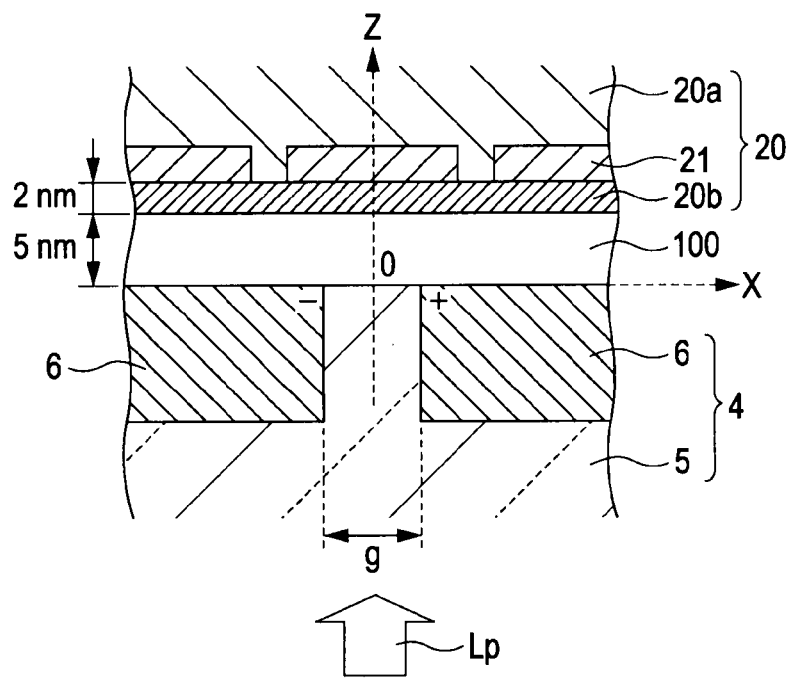
FIG. 29 is a diagram illustrating the analytical conditions of a simulation analysis employed in the second embodiment.

The validity of an optimal relationship between the gap size g between the paired conductors 6 and the distance z between the conductor 6 and the recording mark 21 as described above was evaluated using the FDTD simulation. Referring now to FIG. 29, the model of the simulation analysis and the outline of the analytical conditions will be described. FIG. 29 is an enlarged cross-sectional view of the boundary portion between the recording medium 20 and the flying slider head (near-field light generating unit 4).

In this simulation analysis, the substrate 5 of the near-field light generating unit 4 is made of $SiO_2$ and the conductors 6 are made of Au. In addition, recording marks 21 are formed of Co, and a diamond-like carbon film as a protective film 20b is formed on the surfaces of the respective recording marks 21.

Furthermore, the distance between the surface of the conductor 6 and the surface of the protective film 20b (the thickness of an air layer 100) is set to 5 nm and the thickness of the protective film 20b is set to 2 nm. In other words, the distance z between the conductor 6 and the recording mark 21 is set to 7 nm. In addition, each of the conductors 6 has a length (L) of 220 nm and a thickness (t) of 100 nm (see FIG. 2). In this example, furthermore, the mid-position between the surfaces of the paired conductors 6 is defined as the origin of coordinates of the X axis, the Y axis (the axis in the direction perpendicular to the drawing) and the Z axis.

Furthermore, the simulation analysis of this example is not able to calculate the electric field of the boundary between the recording mark 21 and the protective film 20b because of the specifications of a simulation model used in this analysis. Thus, the field intensity |E|2 at a given position (Z=+8 nm), 1 nm inside from the boundary to the recording mark 21, was determined.

In other words, the field intensity |E|2 at a position of (X, Y, Z)=(0, 0, +8 nm) was determined.

Figure 30:
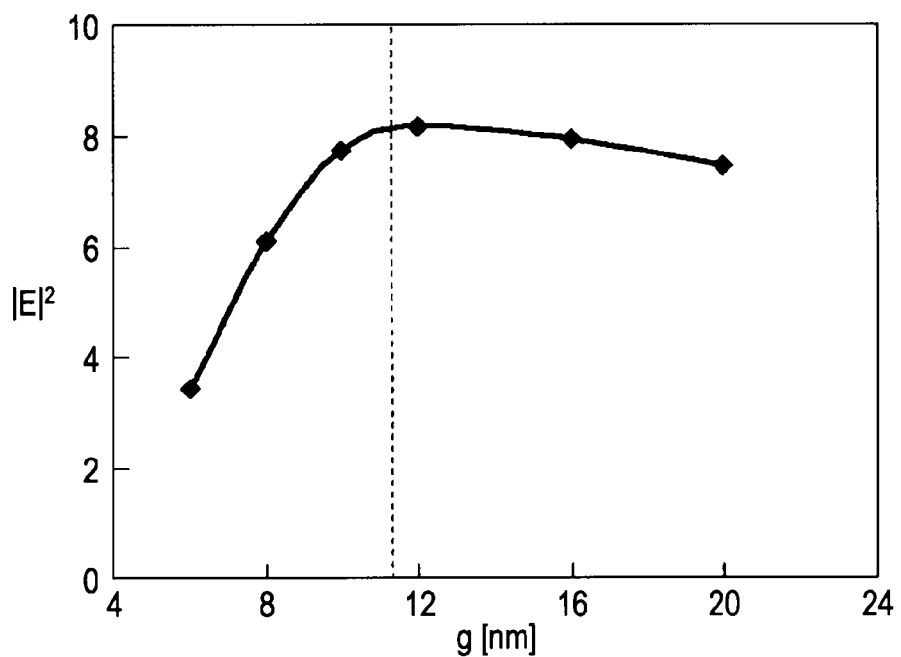
FIG. 30 is a diagram illustrating the results of a simulation analysis employed in the second embodiment.

The results are plotted in FIG. 30.

FIG. 30 illustrates a characteristics chart, where the horizontal axis represents the gap size g between the paired conductors 6 and the vertical axis represents the field intensity $|E|^2$ at a given position of Z=+8 nm. As is evident from FIG. 30, the field intensity $|Ey|^2$ varies depending on the gap size g between the paired conductors 6 just as in the case with FIG. 27. the maximum field intensity can be obtained when the gap size g is about 12 nm. On the other hand, the gap size g at the maximum field intensity is calculated by substituting z=8 nm in the above mathematic equation 1, resulting in g=11.3 nm (dashed line in FIG. 30). From these results, it is found that the gap size g obtained at the maximum field intensity obtained by FDTD and the gap size obtained by the above mathematic expression 1 are well coincident with each other. From this results, it is found that, when the relation of the above mathematical expression 1 is established during the information recording, the maximum field intensity of near-field light irradiated on the recording mark 21 is attained. Thus, the near-field light can be efficiently irradiated on the recording medium 20.

The above embodiments and the modified examples thereof have been applied to the disc-shaped recording media in the above description. However, any of the embodiments of the present invention is not limited to such disc-shaped recording media. Alternatively, a recording medium of any shape other than the disc shape, such as a card-shaped recording medium, may be used and such a recording medium may exert the same effects as those of the disc-shaped recording medium.

The present application contains subject matter related to that disclosed in Japanese Priority Patent Application JP 2008-324272 filed in the Japan Patent Office on Dec. 19, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording/reproducing apparatus, comprising:
an optical source; and
a near-field light generating unit including
a substrate transparent to light from the optical source,
two conductors facing each other at a predetermined distance to generate near-field light between said two conductors by irradiation of the light from said optical source, the two conductors being formed on the substrate, a top surface of each of the two conductors being flush with a top surface of the substrate, the top surface of each of the two conductors spanning an entire horizontal cross-sectional area of a corresponding conductor,
wherein said two conductors are arranged so that a direction along which said two conductors face to each other is substantially in parallel with the longitudinal direction of a recording mark region prepared from a predetermined recording material and having shape anisotropy when information is recorded on a recording medium on which said recording mark is independently formed.

2. The recording/reproducing apparatus according to claim 1, wherein said two conductors have their respective convex portions facing to each other.

3. The recording/reproducing apparatus according to claim 1, wherein a side of said recording mark region facing said two conductors is in the shape of a rectangle.

4. The recording/reproducing apparatus according to claim 1, wherein a side of said recording mark region facing said two conductors is in the shape of an ellipsoid.

5. The recording/reproducing apparatus according to claim 1, wherein a center positions of recording marks on tracks adjacent to each other are staggered in a line direction of said recording medium.

6. The recording/reproducing apparatus according to claim 1, wherein a polarization direction of light emitted from said optical source is substantially in parallel with a direction along which said two conductors face to each other.

7. A recording/reproducing apparatus, comprising:
an optical source; and
a near-field light generating unit including
a substrate transparent to light from the optical source,
two conductors facing each other at a predetermined distance to generate near-field light between said two conductors by irradiation of the light from said optical source, the two conductors being formed on the substrate, an entire top surface of each of the two conductors being flush with a top surface of the substrate,
wherein said two conductors are arranged so that a direction along which said two conductors face to each other is substantially in parallel with the longitudinal direction of a recording mark region prepared from a predetermined recording material and having shape anisotropy when information is recorded on a recording medium on which said recording mark is independently formed, and
a relationship represented by $g=2^{1/2} \cdot z$ is substantially established, where
z is a distance between said conductor and an information-recording surface of said recording medium when said near-field light is irradiated on said recording medium; and g is a predetermined distance between said two conductors.

8. A record reproduction system, comprising:
a recording medium on which recording mark regions having shape anisotropy are independently formed of a predetermined recording material;
an optical source;
a near-field light generating unit including
a substrate transparent to light from the optical source, and
two conductors facing each other at a predetermined distance to generate near-field light between said two conductors by irradiation of the light from said optical source, wherein the two conductors are formed on the substrate and a top surface of each of the two conductors being flush with a top surface of the substrate, the top surface of each of the two conductors spanning an entire horizontal cross-sectional area of a corresponding conductor, said two conductors are arranged so that a direction along which said two conductors face to each other is substantially in parallel with the longitudinal direction of said recording mark when information is recorded on a recording medium using said near-field light.

9. The recording/reproducing apparatus according to claim 1, wherein the light from the optical source irradiates the near-field light generating unit from a bottom surface of the substrate.

10. The recording/reproducing apparatus according to claim 2, wherein each of the two conductors is formed as a triangle, and the convex portions facing each other are respective corners of each triangle.

11. The recording/reproducing apparatus according to claim 10, wherein the two conductors are arranged to form a bow-tie pattern.

12. The record reproduction system according to claim 8, wherein the light from the optical source has a wavelength of 780 nm.

* * * * *